United States Patent
Erb et al.

(12) 
(10) Patent No.: US 6,246,678 B1
(45) Date of Patent: *Jun. 12, 2001

(54) DATA ACCESS SERVER FOR PBX

(75) Inventors: Paul Erb, Ottawa; Brian MacIsaac, Carleton Place, both of (CA)

(73) Assignee: Mitel Corporation, Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,610

(22) Filed: Feb. 13, 1998

(30) Foreign Application Priority Data

Feb. 13, 1997 (CA) .................................. 2197517

(51) Int. Cl.[7] ...................................... H04M 3/42
(52) U.S. Cl. .................... 370/352; 370/354; 370/356; 370/466; 379/88.17; 379/90.01; 379/229
(58) Field of Search ................................ 370/352, 410, 370/354, 356, 268, 466, 522; 379/88.17, 90.01, 219, 220, 229, 231, 230

(56) References Cited

U.S. PATENT DOCUMENTS

| | | | |
|---|---|---|---|
| 4,962,497 | 10/1990 | Ferewe et al. | 370/354 |
| 5,060,227 | 10/1991 | Finley et al. | 370/466 |
| 5,586,117 | 12/1996 | Edem et al. | 370/466 |
| 5,691,984 | 11/1997 | Gardner et al. | 370/466 |
| 5,790,553 | 8/1998 | Deaton, Jr. et al. | 370/466 |
| 5,917,817 | 6/1999 | Dunn et al. | 370/410 |

FOREIGN PATENT DOCUMENTS

| | | |
|---|---|---|
| 2 310 574 | 8/1997 | (GB) . |
| WO 93-18598 | 9/1993 | (WO) . |
| WO 97-42774 | 11/1997 | (WO) . |

Primary Examiner—Salvatore Cangialosi
(74) Attorney, Agent, or Firm—Staas & Halsey LLP

(57) ABSTRACT

A telephony switch configurator to manage and control at least one telephony switch from a network device, said telephony switch containing a read/writable storage medium for storing a configuration of said telephony switch and which is accessible from a computer network through a first data transport protocol handler, the network device communicating with said network through a second data transport protocol handler, said configurator comprising:

(a) a command generator within said network device that issues commands to be executed by said telephony switch;

(b) a first access server within the said network device for managing a connection to said telephony switch;

(c) a first interface between said command generator and said first access server for translating said commands between said command generator to said first access server;

(d) a second interface between said first access server and said data transport protocol handler for translating said commands between said first access server and said data transport protocol handler;

(e) a second access server within the said telephony switch for managing a connection to said network device;

(f) a third interface between said second access server and said second data transport protocol handler for translating said commands between said second data transport handler and said second access server;

(g) a command executor within said telephony switch that executes said commands for changing configuration of said telephony switch; and (h) a fourth interface between said second access server and said command executor for translating said commands between second access server and said command executor.

23 Claims, 9 Drawing Sheets

DATA ACCESS SERVER FOR PBX

FIELD OF THE INVENTION

This invention relates in general to the field of telephony management and control and in particular provides an architecture and method to access, configure and modify the configuration tables and databases on a telephony switch from a local or remote management or work station. In addition, the invention also provides an architecture and method to allow local and network applications access to a telephony switch data base.

BACKGROUND OF THE INVENTION

The architecture of choice for today's computing environment is called client/server computing. In this model, the user benefits from the use of an intelligent terminal and is connected to various applications and services by a local area network (LAN). The local area network allows access to expensive resources and peripherals. The client/server model extends sharing to files, data bases and applications and hardware resources. In doing so, each desk top computer accesses a server to get what it needs. When the user updates a record, it is usually the server data base that gets up-dated, so that everybody in a work group is sharing up-to-date information. The design of client/server applications allow users to set up their screens to match specific needs and preferences, yet have the benefits of shared information.

The client/server model is especially powerful in its ability to mix and match machines from different vendors. The user can select the server best suited to a particular task but choose client machines and devices of differing natures from different vendor based on the preferred graphical user interface or other personal parameters such as multi media, et cetera. New servers that are becoming popular include fax servers, e-mail server, voice mail services. Telephony switches are traditionally not designed to fit into the client/server model Hardware on both the workstation and the server is controlled by a layer of software called an operating system (O/S). The operating system isolates the application from having to know the details of the hardware, and provides a consistent infrastructure on which all applications will run.

One of the key elements of modern application development and design is the concept of an application programmer's interface (API). The API provides a defined interface between various devices or software layers in the computing model so that software developers can focus on their application. In order to achieve this focus, they are provided with the necessary commands that control the device or other applications, without having to know how they work. APIs are relevant to both desk top computer applications as well as server applications. APIs are also an important concept with regard to programming of telephony servers. Most PBXs today support some form of software application programming interfaces (APIs).

In medium size and large businesses, internal telephone calls are handled through a private telephone switch or PBX. While the PBX is in essence a digital electronic device, a natural evolution toward computer telephony integration (CTI) has resulted in the need for connection of PBXs to local area networks so as to function as a network accessible device.

The model used to describe telephone network architectures is quite simple. Users with a terminal device (i.e. a telephone) are connected to a telephony switch which offers a number of services.

The telephone is easily the most recognizable terminal device. It can be analogue or digital, have buttons, displays and can also be wireless. Terminal devices also include fax machines, modems, video phones, alarm systems, LAN equipment and multi media boards for PCs. A terminal device is any piece of hardware that can be attached to the network and can gain access to the PBX. New terminal devices can be added to the network at any time and have immediate access to the range of services with which they are compatible. New services are usually introduced in conjunction with terminal devices design to make the devices easy to use.

The hardware of the PBX is also controlled by an operating system layer of software. The telecom environment has special needs requiring multi user, real time, fault tolerant operating systems. Even the most modem business telephone is a "dumb" set, relaying which button to pushed to the host and turning of the displays as directed.

The heart of a modem switching system is a set of software applications known collectively as call processing. This software provides all of the functionality experienced by the user, from basic call set up to delivering caller ID. The software also provides user features such as call forwarding, enhanced network services such as least call routing and specialized call handling such as ACD for call centres. Call processing is the critical element in designing flexible, configurable, maintainable communication networks.

It is therefore necessary to have software running within the PBX or switch that gives an outside application some control over what is going on. Modern PBX systems provide over two hundred features to improve call handling, although the majority of users never use more than four of them. To offer this, commands are available which activate, suspend or turn off features within the switch. Features include integrated voice response (IVR), voice mail/automated attendant and others.

Moves and changes to the profile of a telephony switch as a result of movements of people within a organization remain difficult to manage. Addressing is complex, with every network element needing to be taken down and re-programmed to change its class of service and class of restriction. One of the goals of modern telecommunications is to provide a PBX system which is not required to be brought "down" every month to make such changes.

For most organizations having large campus environments or complex sites, an architecture is typically implemented that features multiple PBX components distributed throughout the campus or site. These PBX components may be outfitted with network adapter cards and can be connected together over a LAN backbone infrastructure.

One of the existing problems for large sites containing multiple PBXs is management of the components. Many PBXs have custom languages and operating systems. Many telephony switches are not connected to the computer network and even those that are not easy to manage. They are not designed to fit into the client server model. This requires that an administrator be familiar with the switch and switch management interface in order to perform maintenance of features on the switch. In addition, it is common for PBXs to be configured with respect to their internal operation using tables with information regarding the specific features and operations of the switch (i.e. extension numbers, features of the extension, routing, et cetera). An administrator must be familiar with the layout of the features, not only for different versions of the same switch, but also different brands of switches. Moving people and features from one switch to another involves re-programming and in many cases physically visiting or logging on to the switch. There are also difficulties encountered in providing back-up for the switch.

SUMMARY OF THE INVENTION

In one aspect of the invention, there is provided an architecture to manage and control one or more telephony switches and enable and support moves and changes of information stored in telephony switches. According to an additional aspect of the invention that there is provided an architecture to support subsequent applications and uses of information on a telephony switch. In a further aspect of the invention, there is provided generic access to telephony switch databases and views that is compatible with previous versions of telephony switches. A further aspect of the invention provides access to a telephony switch in a protocol independent manner. In a further aspect of the invention, access is provided in a generic manner for search, read, write, add, delete, first, next, previous and last operations. In a further aspect of the invention access to a telephony switch is provided in a manner which allows for transaction management. In a further aspect, there is provided a mechanism for a telephony switch to communicate back to other network devices, including other telephony switches. In a further aspect of the invention switch database programming verification is provided and switch database engineering rules are followed.

Therefore, in accordance with a preferred embodiment of the invention, an application programming interface (API) is provided which is independent of different versions of operating systems and switches that is enabled within the switch to communicate with the network control server management station. The network control server management station can access and delete information from a custom database in the switch and can install such information in another database. This feature simplifies the addition of new features in the switch.

According to one aspect of the present invention, there is provided a telephony switch configurator to manage and control one or more telephony switches from a network device, each of the telephony switches containing a read/writable storage medium for storing configuration of the telephony switch and being accessible from a computer network through the data transport protocol handler, the network device communicating with the network through the data transport protocol handler, the configurator comprising:

(a) a command generator within the network device that issues commands to be executed by the telephony switch;

(b) a first access server within the network device for managing a connection to the telephony switch;

(c) a first interface between the command generator and the first access server for translating the commands between to command generator and the first access server;

(d) a second interface between the first access server and the data transport protocol handler for translating the commands between the first access server and the data transport protocol handler;

(e) a second access server within the telephony switch for managing a connection to the network device;

(f) a third interface between the second access server and the second data transport protocol handler for translating the commands between the second data transport handler and the second access server;

(g) a fourth interface between the second access server and the command executor for translating the commands between the second access server and the command executor; and (h) a command executor within the telephony switch that executes the commands changing configuration of the telephony switch.

According to another aspect of the invention, there is provided a method of managing and controlling a telephony switch from a network device, the telephony switch communicating with a computer network through a data transport protocol, and the network device communicating with the network through the data transport protocol, comprising the steps of:

a) initiating a command to connect to a selected telephony switch from the network device;

b) translating the command to a format understood by first access server;

c) passing the command to the first access server;

d) opening a communications channel to the specific telephony switch;

e) packaging the command for transport using data transport protocol;

f) passing the command to data transport protocol mechanism;

g) transporting the command on the network to the specified telephony switch using the data transport protocol;

h) unpackaging the command received by the telephony switch using the data transport protocol mechanism;

i) passing the command to a second access server;

j) translating the command to a form which can be executed by the telephony switch; and k) executing the command on the telephony switch changing the configuration of the telephony switch.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
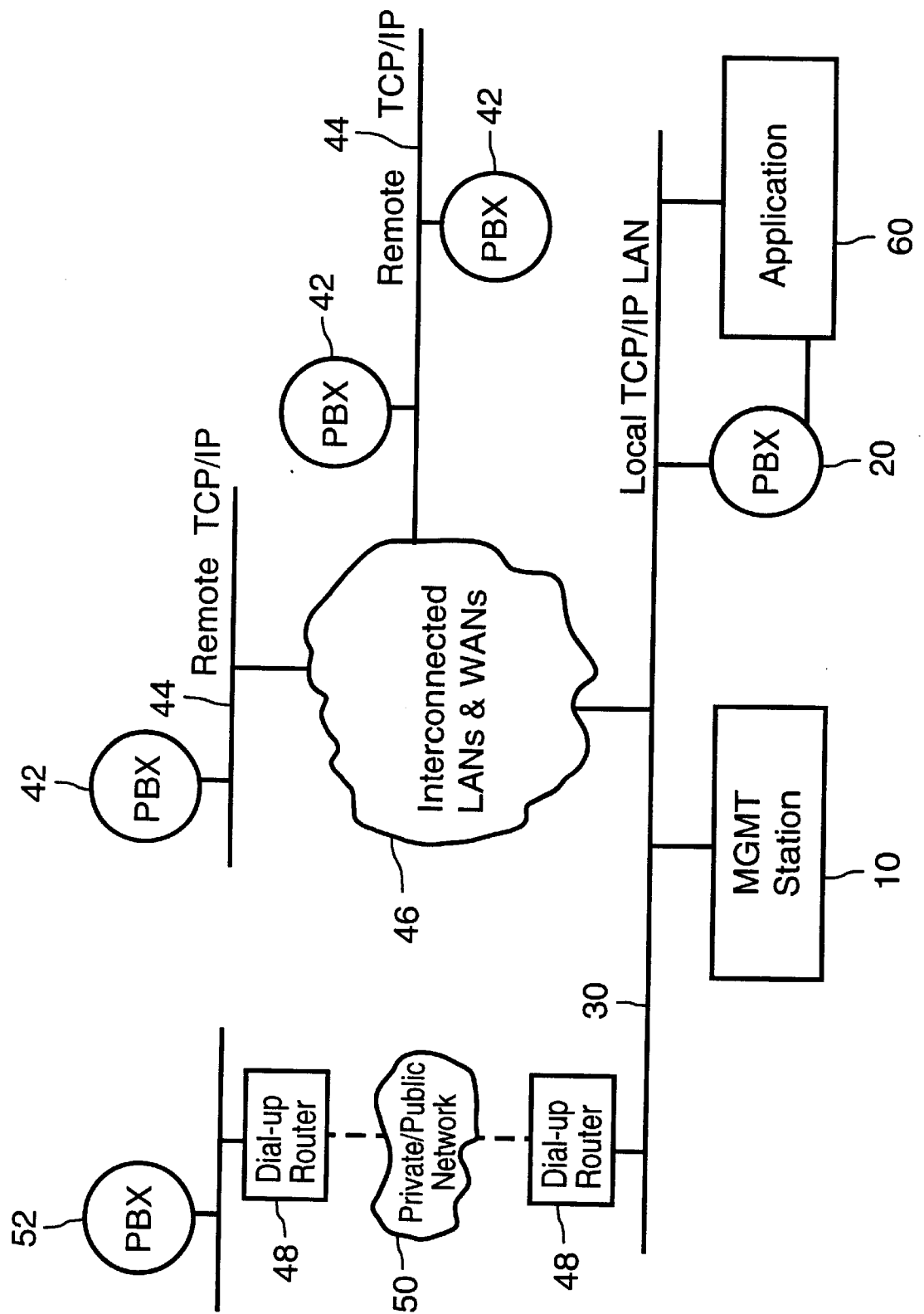
FIG. 1 is a block diagram showing a network configuration environment for use of the present invention.

Turning to FIG. 1, an overview of the use of the present invention in a network configuration is shown. The invention is implemented to effect connections which can be made directly or indirectly through an Ethernet network. It is also within the scope of this invention that other network protocols (e.g., token ring, FDDI, et cetera) may be used. Serial connections may also be used although performance considerations must be taken into account. In the preferred embodiment, management station 10 obtains access to telephony switch 20 through local area network 30. In the preferred embodiment, local area network 30 is an Ethernet network running TCP/IP, however, it is within the scope of the invention that other network topologies and protocols may be used. In an alternate embodiment of the invention, management station 10 can interface with one or more telephony switches 42, located on remote networks 44 through interconnected local area networks and wide area networks 46 such as are well known in the art. In an alternate embodiment, management station 10 can interface with telephony switch 52 by utilizing routers 48 connected to a private or public network 50.

Figure 2A:
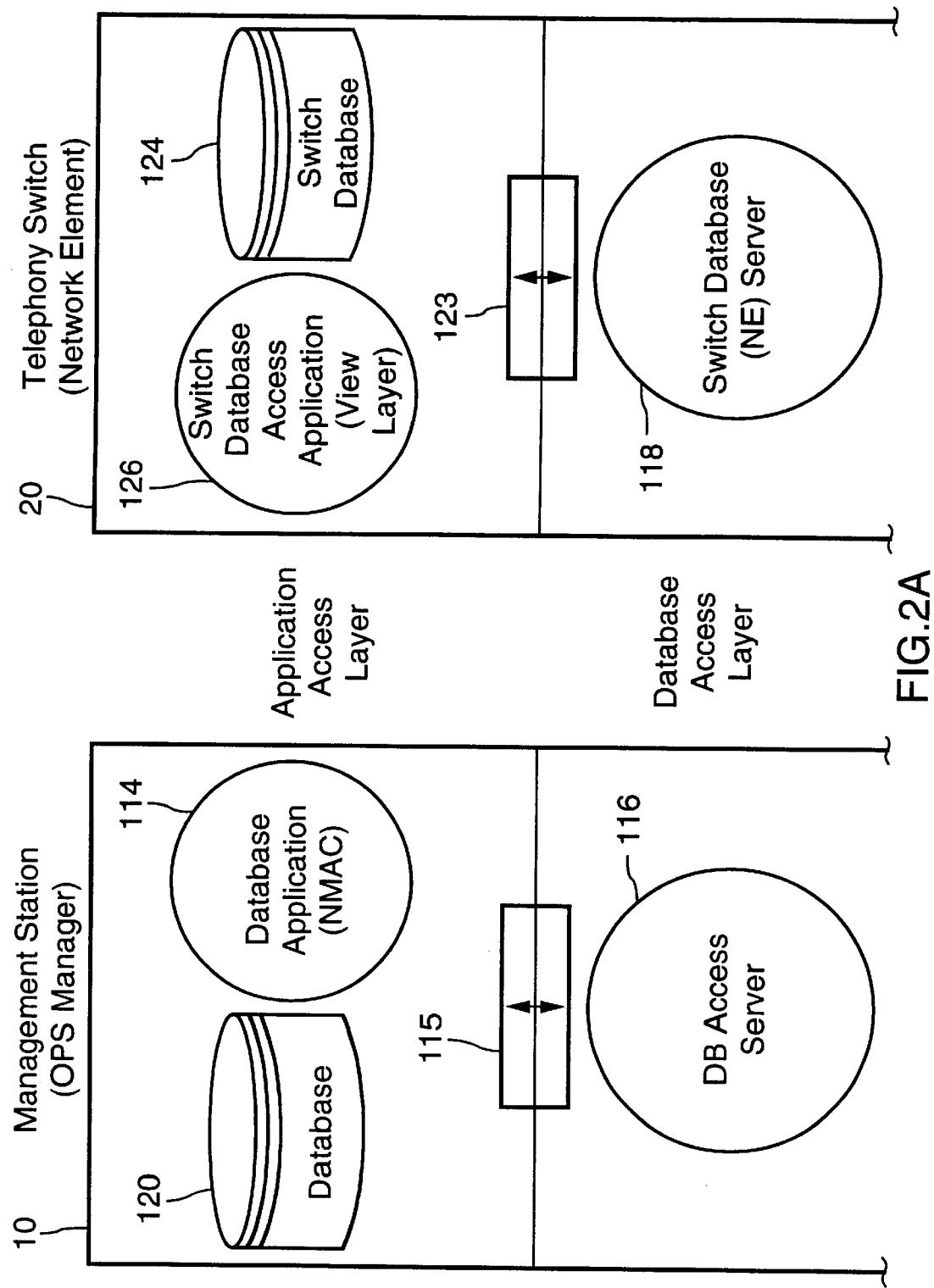
FIGS. 2A–2B are block diagrams of the architecture according to the present invention implemented in relation to existing telephony management stations and telephony switch architectures.
Figure 2B:
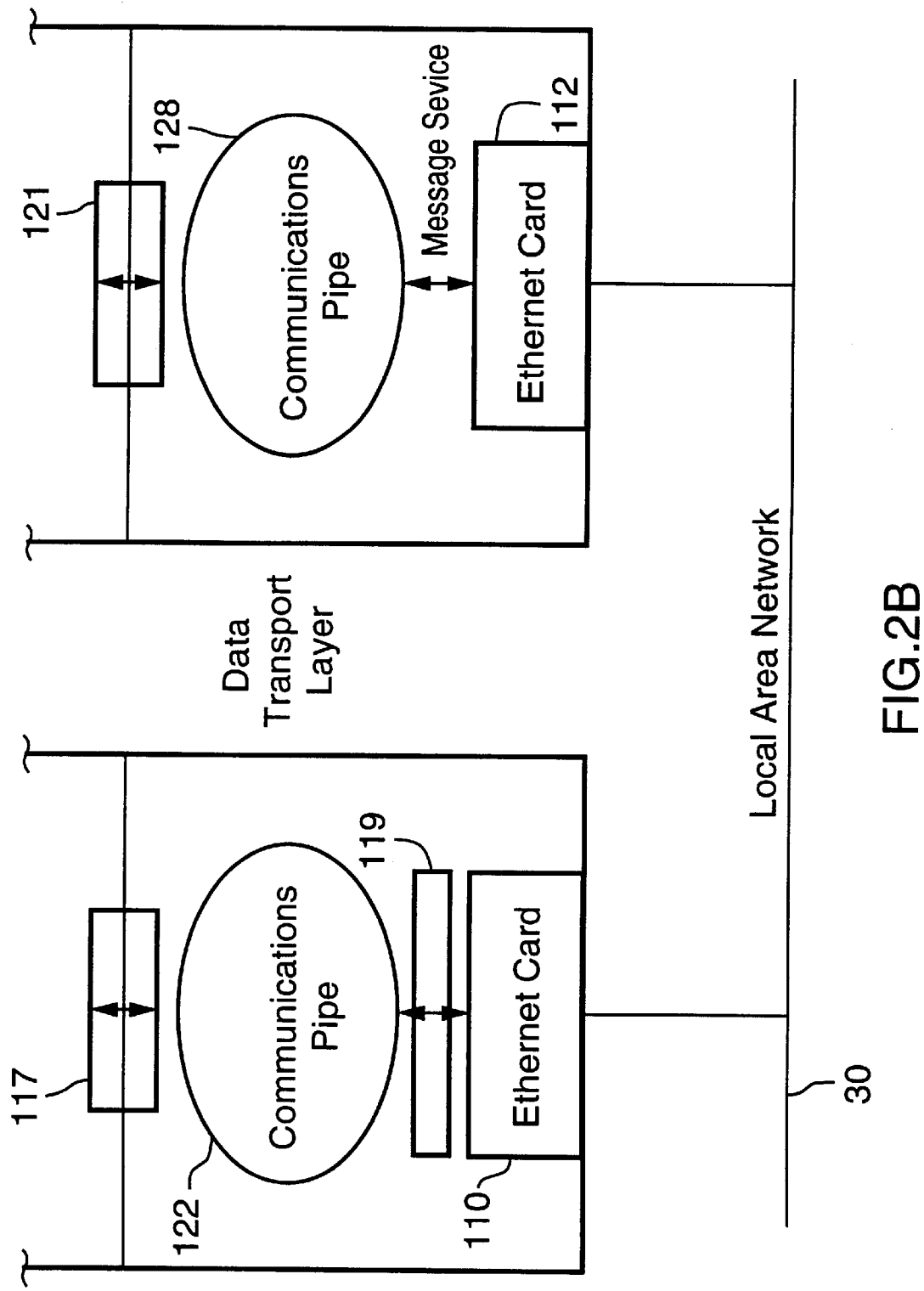
Figure 3A:
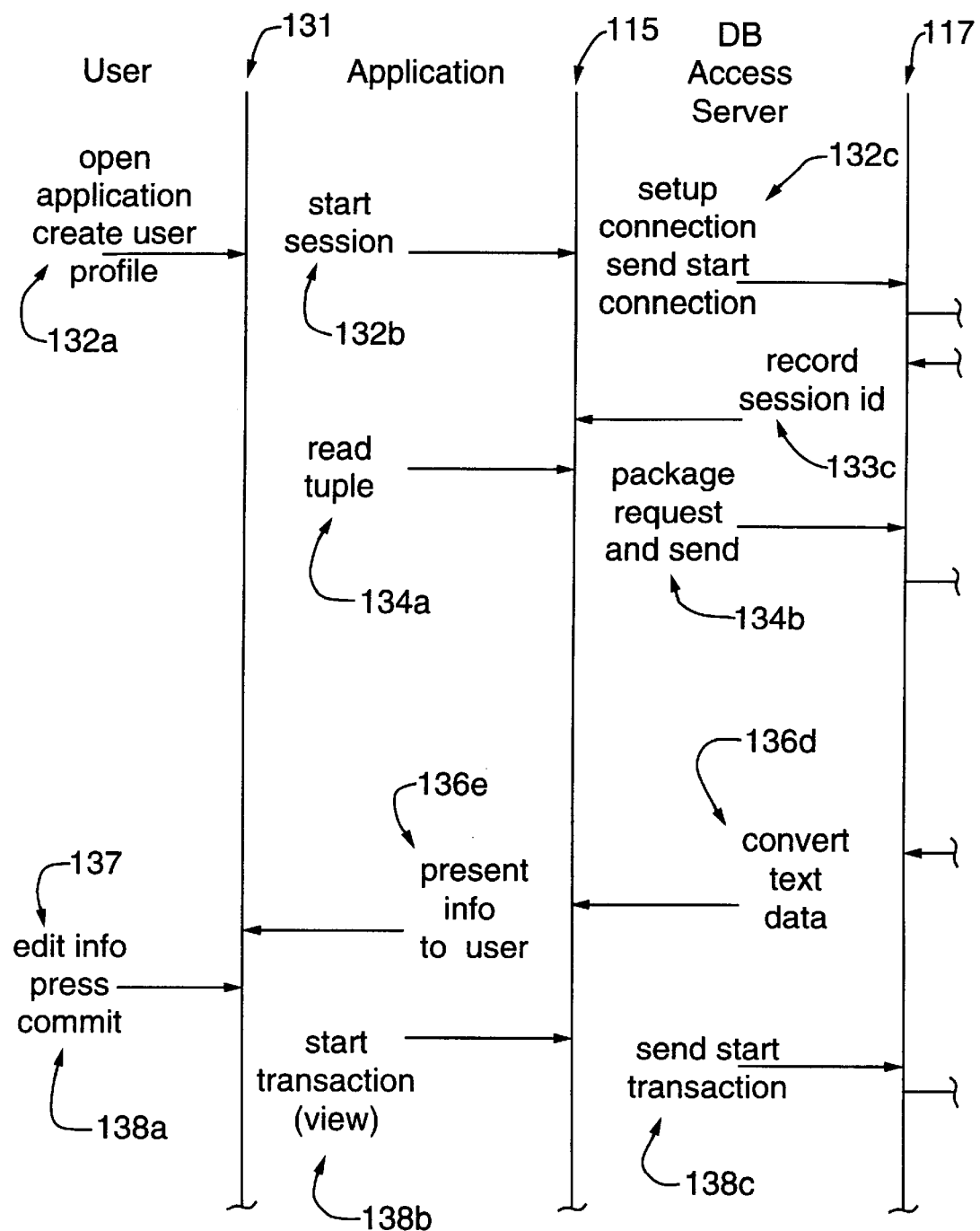
FIGS. 3A–3D are diagrams depicting the message flow between a user and a telephony switch according to the present invention.
Figure 3B:
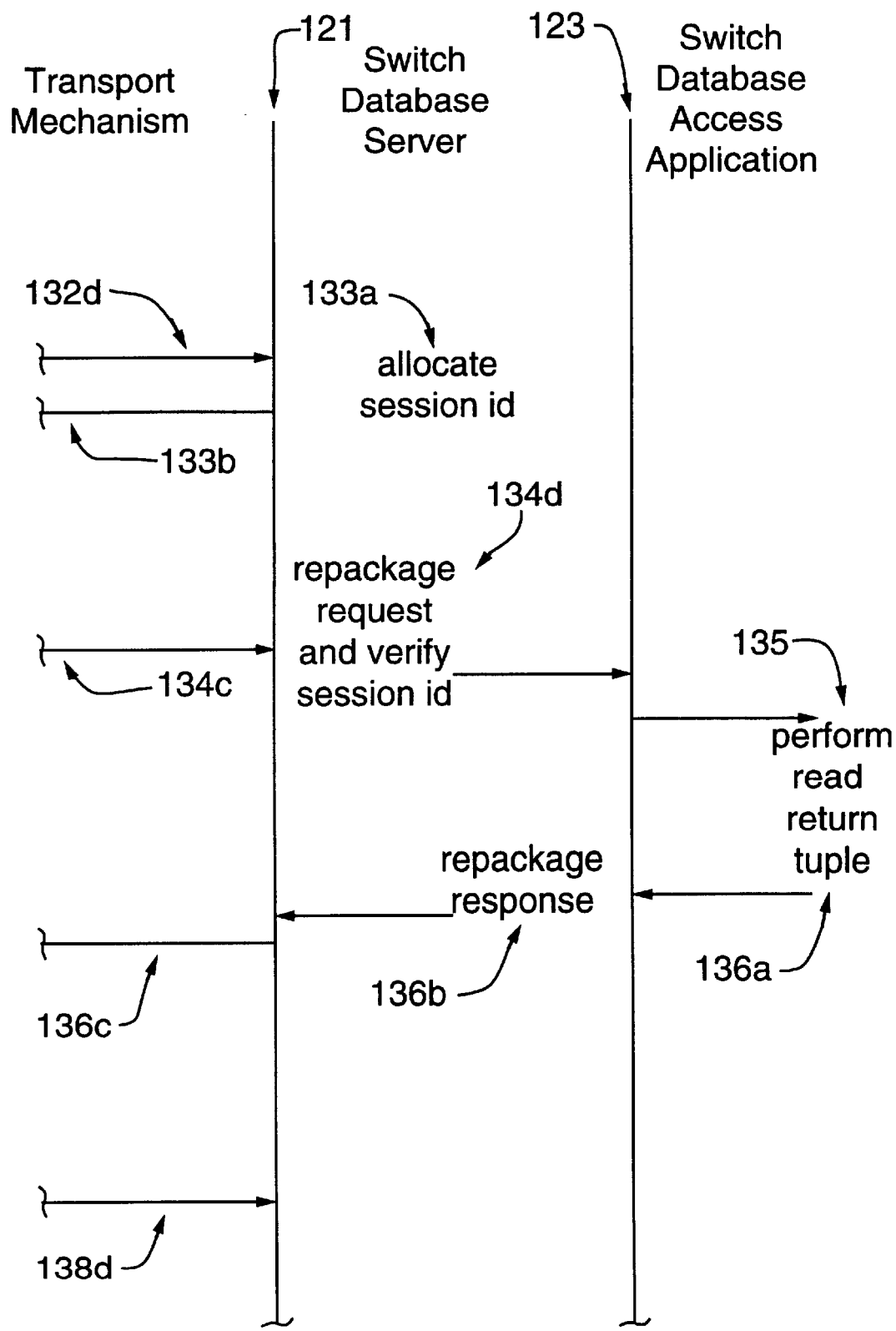
Figure 3C:
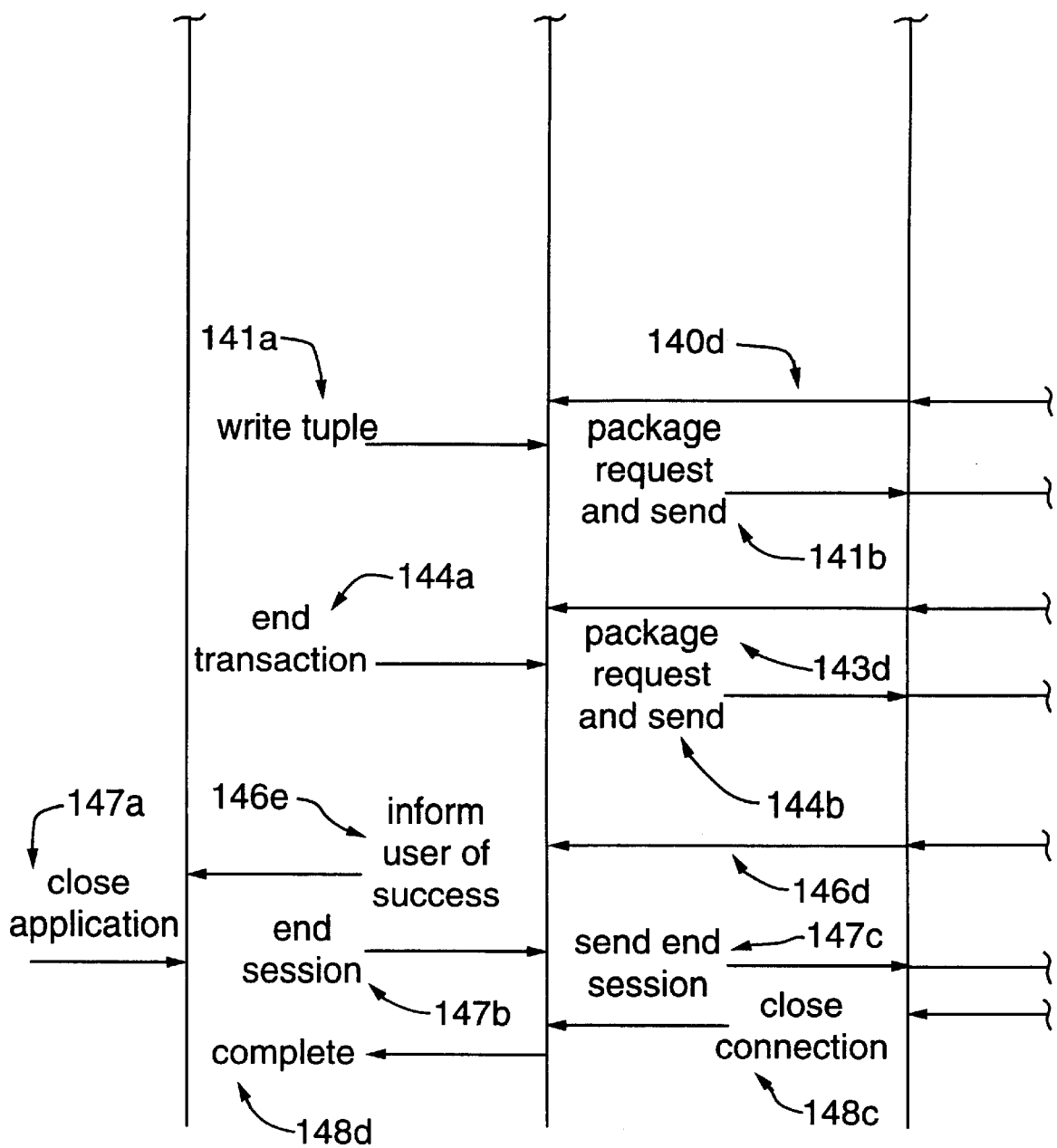
Figure 3D:
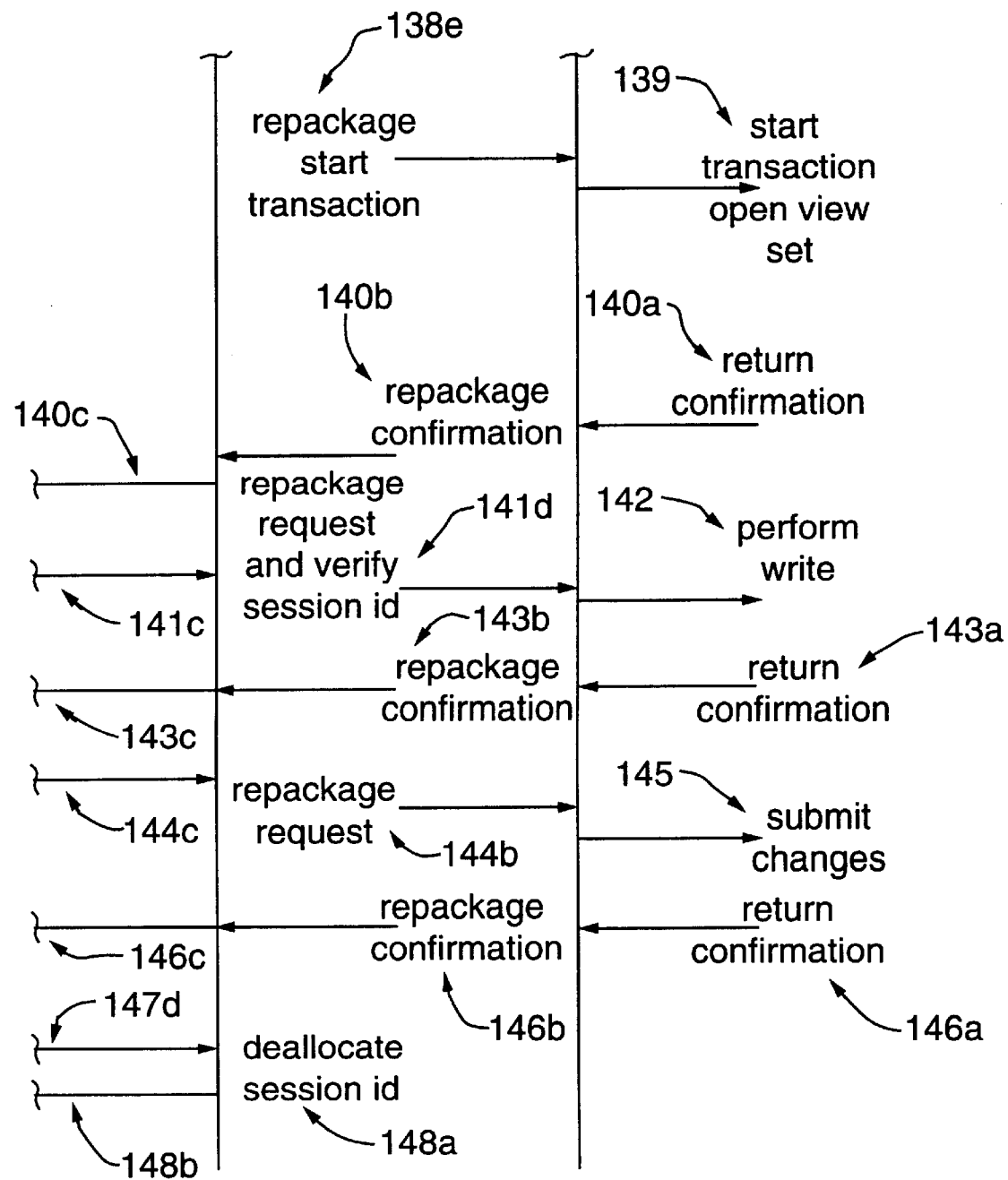

Turning to FIG. 2, an overview of the architecture of the present invention is shown. While FIGS. 2 to 5 relate to the preferred embodiment of the invention in the context of operating on a local area network, it will be obvious to one skilled in the art to modify and practice the invention utilizing other network interconnection methods and structures, including those described in FIG. 1. The invention is facilitated by a combination of layered software components. The components cooperate with existing software in the management station 10 and the telephony switch 20 to provide access to specific operations of telephony switch 20. According to the preferred embodiment, in order to provide this access, a database access layer is created in both the management station 10 and the telephony switch 20. The database access layer is facilitated by a DB access server 116 residing in management station and a switch database server 118 residing in telephony switch 20.

Consequently, six major aspects are described herein below to facilitate the present invention:

(1) Interface between the Application and Database Access Layer in the Management Station;

(2) Database Access Layer in the Management Station (3) Interface between Database Access Layer and the Data Transport Layer in the Management Station;

(4) Interface between Data Transport Layer and the Database Access Layer in the Telephony Switch;

(5) Database Access Layer in the Telephony Switch;

(6) Interface between the Database Access Layer and the Application Layer in the Telephony Switch.

On management station 10, the application layer consists of an application 114 which is required to access information stored on telephony switch 20. Application 114 generates commands to be sent to the telephony switch 20. In the preferred embodiment of the present invention, management station 10 connects to telephony switch 20 via local area network 30. Management station 10 in the preferred embodiment is a Unix™ or Windows™ based work station, however, computer work stations utilizing other operating systems may be used. In the preferred embodiment, management station 10 is connected to local area network area 30 via Ethernet card 110. In a similar manner, telephony switch 20 is connected to local area network 30 via Ethernet card 112. Although the application 114 is described as a database application, the use of the present invention is not restricted to a database application. Any application capable of running on a management station 10 or a computer workstation that requires access to information on telephony switch 20 may do so using the principles of the present invention. In an alternate embodiment, the invention may be implemented so that an application operating on any device connected to the network is provided access to information stored on telephony switch 20. In such an embodiment, the application and the architecture of the present invention may reside or be implemented completely in hardware.

Database 120 stores information on various types, models and features of telephony switch 20 accessible via a network 30. Through the application 114, various settings can be downloaded into the database 120 on the management station 10. Within the management station, the settings can be manipulated, modified or changed and sent back to the telephony switch 20 for update. In this manner, the administrator can be insulated from the arcane language and parameters required to update the settings on telephony switch. In addition, moves and changes can easily be implemented by downloading the feature set from the telephony switch being moved from and then reloading the same feature set into the telephony switch being move to. Furthermore, the translation of features where the parameters for a feature may vary from one switch to another switch can be performed automatically, without the administrator being required to know the different parameters for a feature from the one switch to the other switch. A list of supported features can also be stored in the database 120 and translated for the user so that a universal user interface is presented. In the preferred embodiment, database application 114 is written in the "C" programming language and database 120 is managed by the Oracle database management system (DBMS). The invention is not limited to an Oracle DBMS, the invention may be adapted to use any such DBMS as is well known in the art. Database application 114 communicates with DB access server 116 through interface 115. Interface 115 is described in further detail with respect to FIG. 4.

DB access server 116 in the database access layer communicates with a communications pipe 122 in the data transport layer through interface 117 to facilitate communications with the telephony switch 20. Interface 117 provides the database access layer with a mechanism and protocol to handle and transport commands and the data to telephony switch 20. Interface 117 is described in further detail below with respect to FIG. 4. Communications pipe 122 communicates through interface 119 with Ethernet card 110 to transfer information to telephony switch 20. In the preferred embodiment, the communications pipe 122 and interface 119 are existing processes which manage connections with individual network devices.

Returning to the telephony switch 20 of FIG. 2, the operation of telephony switch 20 is accessed, controlled and operates according to settings stored in database 124. The telephony switch 20 is generally an electronic device, with memory storage means, an operating system and a command language. The information regarding the configuration of the telephony switch 20 is stored in database tables, with each row of a table being accessible as a tuple, either directly or indirectly through a view. A tuple is a composite view of a database record or parts of several records that represents the smallest granularity of data in a database. Tuples consist of one or more fields that are accessible by field names. The information (or tuples) in the table is accessible by switch database access application 126 and the commands sent to the telephony switch 20 are processed and executed by switch database application 126.

In the example that follows, the structure of database 124 conforms to that as is exemplified in Mitel® PBX model SX-2000®. However, it will be obvious to one skilled in the art that the invention can be modified to operate on tables in other formats such a system is described in U.S. Pat. No. 4,615,028, issued Sep. 30, 1986 and U.S. Pat. No. 4,616,360, issued Oct. 7, 1986. The switch database access application 126 is a program which regulates access to the database 124. Switch database access application 126 and database 124 reside in the application layer of telephony switch 20. The switch database access application 126 in the application layer communicates with switch database server 118 through interface 123. The interface 123 is described in further detail with respect to FIG. 5. The switch database server 118 of the database access layer communicates with the communications pipe 128 of telephony switch 20 through interface 121. The interface 121 provides the database access layer in the telephony switch 20 with a mechanism and protocol to transport commands and data to the management station 10. The interface 121 is described in further detail with respect to FIG. 5. The communications pipe 128 communicates with Ethernet card 112, passing information onto local area network 30 to be received by management station 10. The communications pipe 128 is an existing library of functions which manages the translation between data representations used in the data transport, and those required in the Database Access Layer. The communications pipe 128 in the preferred embodiment of the present invention is provided by an existing transport mechanism such as Opsman MNMS which is supplied by Mitel®. However, it is within the scope of this invention that other transport mechanisms may be used. One of the features provided by the present invention is that network devices can be enabled to communicate with the telephony switch 20 so that the telephony switch can be integrated into networked applications. Users may be enabled to control their own telephony settings from their desktop computer. In addition, features on the telephony switch 20 can be offered to take advantage of the telephony switch as a network device that allows applications 114 through the present invention to communicate with and integrate the telephony switch 20 into the workplace environment.

Message Flow

Turning to FIG. 3, an example of the use of the present invention is illustrated. FIG. 3 illustrates the flow of information on a transaction to read a tuple and write a tuple through an application 114. The application 114 is presented to a user on a video display screen as is typically used on a computer workstation. A user communicates with an application running on management station 10 through user interface 131. The application 114 communicates with DB access server 116 through interface 115. DB access server 116 communicates with transport mechanism 130 through interface 117. Transport mechanism 130 communicates with switch database server 118 through interface 121. Switch database server 118 communicates with switch database access application 126 through interface 123. Starting at the top left hand corner of FIG. 3, at step 132*a*, through user interface 131, typically a screen, keyboard or other input/output device opens or starts application 114 which causes a user profile to be executed. At step 132*b*, application 114 starts a session and communicates the message through interface 115 to DB access server 116. At step 132*c*, DB access server 116 sets up the connection and sends the start session message through interface 117 to the transport mechanism 130. At step 132*d*, the transport mechanism 130 transports the message to the switch database server 118 on telephony switch 20 through interface 121. At step 133*a*, upon receiving the message at step 132*d*, the switch database server 118 allocates a session ID and passes the session ID back through interface 121 to transport mechanism 130. At step 133*b*, the transport mechanism 130 passes the message through interface 117 to DB access server 116. At step 133*c*, the DB access server 116 records the session Id and passes the message to application 114 through interface 115. Upon receipt of the message, application 114 submits the request to read a tuple at step 134*a*. That request is sent back through interface 115 to DB access server 116. At step 134*b*, DB access server 116 packages the request and sends it through interface 117 to transport mechanism 130. At step 134*c*, transport mechanism 130 transfers the message to switch database server 118 on telephony switch 20 through interface 121. At step 134*d*, switch database server 118 verifies the session ID and re-packages the request, and passes the message through interface 123 to switch database access application 126. At step 135, upon receiving the request, switch database access application 126 performs the read and at step 136*a* returns a tuple through interface 123 to switch database 118. At step 136*b*, switch database server 118 re-packages the request and passes it to transport mechanism 130 through interface 121. At step 136*c*, transport mechanism 130 passes the response through interface 117 to DB access server 116. At step 136*d*, DB access server 116 converts the text data into the proper format and passes the data to application 114 through interface 115. At step 136*e*, application 114 presents the information to the user through user interface 131. At step 137, the user edits the information. Once editing is complete, the user, at step 138*a*, issues the commit command through user interface 131 to application 114. At step 138*b*, application 114 issues a start transaction message and passes the message through interface 115 to DB access server 116. At step 138*c*, Db access server 116 sends the start transaction message through interface 117 to transport mechanism 130. At step 138*d*, transport mechanism 130 passes the message through interface 121 to switch database server 118. At step 138*e*, switch database server 118 re-packages the start transaction message and passes it through interface 123 to switch database access application 126. At step 139, switch database access application 126 starts the transaction. When the transaction is ready for execution at step 140*a*, switch database access application 126 returns a confirmation through interface 123 to switch database server 118. At step 140*b*, switch database server 118 re-packages the confirmation and passes it through interface 121 to transport mechanism 130. At step 140*c*, transport mechanism 130 passes the confirmation through interface 117 to DB access server 116. At step 140*d*, DB access server 116 passes the confirmation message through interface 115 to application 114. At step 141*a*, upon receipt of the confirmation, application 114 issues the command to write the tuple through interface 115 to DB access server 116. At step 141*b*, DB access server 116 re-packages the request and sends it through interface 117 to transport mechanism 130. At step 141*c*, transport mechanism 130 passes the request through interface 121 to switch database server 118. At step 141*d*, switch database server 118 verifies the session ID and re-packages the "write" request to be sent through interface 123 to switch database access application 126. At step 142, switch database access application 126 executes the write command. Upon successful completion of the write, at step 143*a*, switch database access application 126 returns confirmation of successful write through interface 123 to switch database server 118. At step 143*b*, switch database server 118 re-packages the confirmation and passes it through interface 121 to transport mechanism 130. At step 143*c*, transport mechanism 130 passes the request through interface 117 to DB access server 116. At step 143d, DB access server 116 passes the confirmation through interface 115 to application 114. At step 144a, upon receipt of the confirmation, application 114 sends the command to end the transaction back through interface 115 to DB access server 116. At step 144b, DB access server 116 re-packages the request and sends it through interface 117 to transport mechanism 130. At step 144c, transport mechanism 130 passes the request through interface 121 to switch database server 118. At step 144d, switch database server 118 re-packages the request and passes it through interface 123 to switch database access application 126. At step 145, upon receipt of the request, switch database access application 126 submits the changes to the hard drive and ends the session. At step 146a, upon successful conclusion of the session, switch database access application 126 returns a confirmation through interface 123 to switch database server 118. At step 146b, switch database server 118 re-packages the end session confirmation and passes it through interface 121 to transport mechanism 130. At step 146c, transport mechanism 130 passes the confirmation through interface 117 to DB access server 116. At step 146d, DB access server 116 passes the confirmation through interface 115 to application 114. At step 146e, application 114 informs the user of the success of the transaction through interface 131. At step 147a, the user, upon being informed of success, closes the application which causes a message to be sent back through user interface 131 to application 114. At step 147b, application 114 issues the end session message through interface 115 to DB access server 116. At step 147c, DB access server 116 sends the end session message through interface 117 to transport mechanism 130. At step 147d, transport mechanism 130 sends the end session message through interface 121 to switch database server 118. At step 148a, upon receiving the end session message, switch database server 118 de-allocates the session ID and passes the confirmation through interface 121 to transport mechanism 130. At step 148b, transport mechanism 130 passes the confirmation through interface 117 to DB access server 116. At step 148c, DB access server 116 sends the close connection message through interface 115 to application 114. At step 148d, upon receipt of confirmation message of closure of the connection, application 114 terminates.

1) INTERFACE BETWEEN THE APPLICATION AND DATABASE ACCESS LAYER IN THE MANAGEMENT STATION

Figure 4:
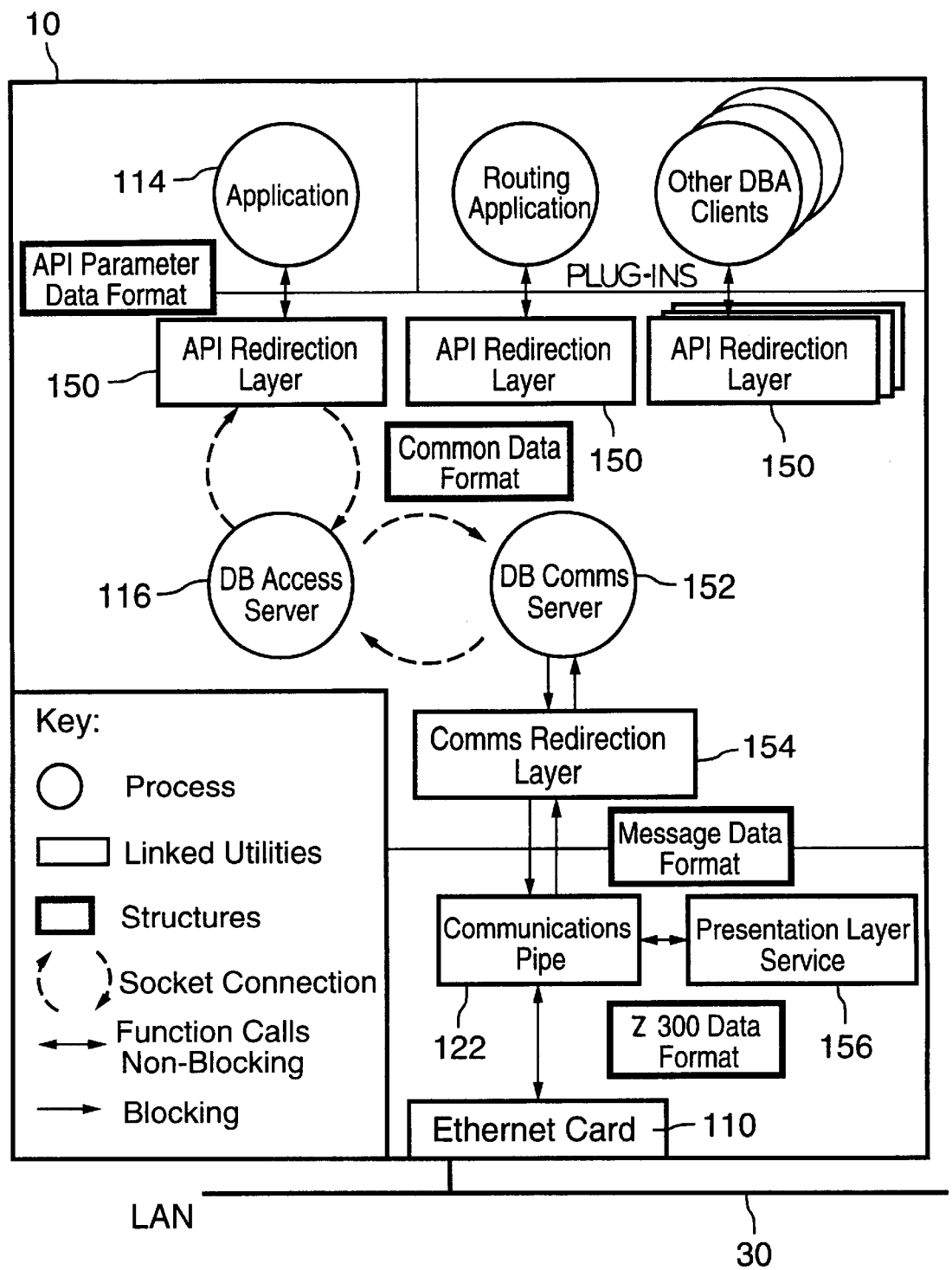
FIG. 4 is a detailed block diagram of an OPS manager according to the preferred embodiment installed in a telephony management station.

Turning to FIG. 4, in order to utilize the present invention, an application 114 establishes a Database Access Session with the telephony switch 20. Within the session the application 114 can search, read and write database tuples within the switch database 124.

Multiple telephony switches can be accessed simultaneously by the application 114 through independent Database Access Sessions.

The invention provides support for a set of operations which provide application 114 with access via the switch database access application to the switch database 124. Additional support is described for failure recovery and backwards compatibility. In the following discussion Switch and Network Element are used interchangeably.

The structure of the interface between the application layer and the Database Access Layer on the Management Station is provided by the functions (known as "API" functions) as described.

All of the above functions, except the tuple management functions, on the management station side have a mirrored function on the telephony switch 20 side. When the application 114 exercises one of the above functions, the function is packaged and transported to the telephone switch, where it is received, unpackaged and delivered in a format understood by the switch database access application for execution. In this manner, the user executing application 114 on the management station 10 is isolated from the peculiarities of the switch, as the application 114 can take care of any translations or data structure formats applicable to any particular brand, model or version of switch. Each of these functions are called from the application layer and passed through to the database access layer for further processing. Results are passed back from the database access layer back through to the calling function in the application layer. Fore more information on the data types passes, pleased refer to the section "DB Access Server in the Management Station"

Detailed Description of Functions (a) Error Identification—In the case where success is not returned, an error code is returned and optionally passed as a variable to the application 114 signifying the error encountered. The application 114 may optionally be referred to a look-up table for the text of the error code, and return the error text to the user.

(b) Application Registration—This requires the application 114 to be registered with the DB access server 116 prior to performing operations. This group of functions operates within the management station 10. Registration is an important element in the communication between application 114 and DB access server 116. The application 114 is designed to understand certain versions and revision levels of telephony switch 20. When registration occurs, the application 114 provides to the DB access server 116 the version and revision level information that the application is designed to handle. In the event that the application seeks to communicate to a telephony switch 20 of a lesser version than that which the application is capable of understanding, the DB access server converts the data from the version understood by the application to the version understood by telephony switch 20. This mechanism can also be used to operate in the opposite direction. Where an application is communicating with a telephony switch of a greater version than the application, the DB access server 116 can perform the necessary translation of the data for communication with the telephony switch 20. When a data translation is necessary, the DB access server 116 adds, translates or omits data as necessary to facilitate communication with telephony switch 20. The application 114 is required to deregister to relinquish use of system resources. The registration operations are:

(i) Register
(ii) Deregister

An application 114 needs to register only once. Subsequent registrations result in success and utilize the previously established DB access server 116 communication channels.

(i) Register—In order to utilize DB access server 116, an application must first register itself by calling the register function. An application 114 is registered by calling the register function and providing the name of the application as well as the edition of Switch Database it understands as variables. The register function establishes a connection to the DB access server 116 which handles all subsequent DB access requests. The function will return a value indicating the success or failure of the operation. In the event the start session fails, Database Access is not available. If a Database Access session already exists, success is returned.

(ii) Deregister—When an application 114 wishes to terminate access, the deregister function is called. Communication with the DB access server 116 is terminated. The function will return a value indicating the success or failure of the operation. If communication with the DB access server 116 was previously terminated or does not exist, or a session is active, or a transaction is active, failure is returned. Any sessions and transactions must be explicitly terminated by the application 114 prior to deregistering.

(c) Session Management—Operations to access each switch database 124 are conducted within the confines of a 'session'. An application 114 starts a session, conducts a series of database access operations, and ends the session. The management of the session is done by the underlying data access layer and data transport layer which performs operations such as, opening and closing the communications pipe 122 to the switch 20, packaging application requests and sending them to the switch 20, and presenting request results to the application 114. The session management operations are simply:

(i) Start Session (ii) End Session.

A session is catalogued and identified by a unique session ID. The telephony switch 20 is responsible for allocating and presenting the session ID to the DB access server 116. This is described in further detail below. An application 114 can only have one session opened per telephony switch. Any attempt to start another session for the same telephony switch will be rejected. Sessions can only be initiated on the active plane where applicable and are dropped when an activity switch occurs.

(i) Start Session—In order to access the switch database of a telephony switch 20, an application 114 must start a database access session. A session is started by calling the start session function and providing the identifier of the specific telephony switch 20 as a variable that the application 114 wishes to access and the destination plane. The ID of the switch is entered through the application 114. The start session function will establish a connection to the specified telephony switch 20 through the network or connection mechanism and assign a session ID to that connection. The function will return a value indicating the success or failure of the operation. The session ID is passed back to the calling application 114 as a session_ID parameter. The application must use this session ID for subsequent access requests for the duration of the session. In the event the start session fails, access to a switch database 124 is not available for the telephony switch 20. If a database access session already exists, or communication to the telephony switch 20 cannot be established, failure is returned. On switches with multiple planes (fault tolerant redundancy) the desired plane can be identified for access.

(ii) End Session—When an application 114 wishes to terminate the current session, the session end function is called. The current Session_ID is passed as a parameter to the function. The communications pipe 122 to the switch 20 will be closed. The function will return a value indicating the success or failure of the operation. If the session was previously terminated or does exist, or a transaction is active, failure is returned. The transaction must be explicitly terminated by the application 114 prior to ending a session.

(d) Transaction Management—As discussed above, the present invention is described with respect to a Mitel® SX-2000® switch. On such a switch, access to the database is provided by a view layer with the database tables 124 being manipulated as a view set, as part of the switch database access application 126. It is obvious to one skilled in the art to make the necessary moderations to the present invention to be adapted to a telephony switch of a different design or manufacture where such view sets are not used. Any database operations that will modify the switch database 124 must be conducted within the confines of a transaction. Three transaction functions are provided:

(i) Start Transaction (ii) Submit Transaction (iii) Cancel Transaction.

An application 114 can only have one transaction active per telephony switch 20. Any subsequent start transaction request for the same telephony switch 20 will be rejected.

(i) Start Transaction—In order for an application 114 to make database modification requests, a transaction must be initiated. The application 114 starts a transaction by calling the start transaction function and passing in the session ID allocated when the start session function was called. When communicating with an SX-2000® switch, the application 114 must also specify the view set, where applicable, of the switch database access application 126 that is to be opened during the transaction. The appropriate view set for each version of switch is either preloaded or contains the database 120 on management station 10 or is entered through the application interface. The application view set is used according to the operation selected by application 114. The session ID is validated and a request is sent to the telephony switch 20 to open the specified view set. The function will return a value indicating the success or failure of the operation. If the start transaction fails, the view set of the switch database 124 is not opened for write access. If one or more views of a switch database 124 have already been opened by another application 114, failure is returned. Only the views specified will be available for modification. The view set open cannot be changed during a transaction. Any attempt to modify other views within the current transaction will be rejected. However, GET and FIND operations will be allowed for other views with in the current transaction.

(ii) Submit Transaction—When an application 114 wishes to submit the current transaction, it calls the submit transaction function and specifies the current session ID. The submit function will issue a submit request to the telephony switch 20 and closes the transaction regardless of success. The function returns the success or failure of the operation. If a transaction is not in progress, failure is returned.

(iii) Cancel Transaction—When an application 114 wishes to cancel any changes it has made to the switch database 124, it calls the cancel transaction function with the current session ID. The cancel function sends a cancel transaction request to the telephony switch 20 and terminates the transaction. The function returns the success or failure of the operation. If a transaction is not in progress, failure is returned.

(e) Read/Write Functions—A tuple is a composite view of a database record or parts of several records that represents the smallest granularity of data in a database. Tuples consist of one or more fields that are accessible by field names. All like tuples are contained within a database view. Four basic tuple manipulation functions are provided:

(i) Get Tuple (ii) Add Tuple (iii) Delete Tuple (iv) Modify Tuple.

With the exception of the GET and FIND operations, all operations must be conducted within the context of a transaction. All of the operations must be called within the context of a session.

(i) Get Tuple—An application 114 can get the contents of a single tuple from a telephony switch 20 for a particular view and tuple key by calling the get tuple function. The application 114 must provide the current session ID, the view ID or table names for the tuple requested, and a tuple structure with the key portion filled in. The view ID, tuple structure and tuple mask are dependent on the make, model and version of telephony switch being accessed, the structure being stored in database 120 for use by application 114. Optionally, information on tuples can be obtained by calling the Get Tuple Definition function described below. The Get Tuple function returns a value indicating the success or failure of the operation. The tuple contents are returned in the tuple parameter. If the tuple does not exist or can not be read, failure is returned. This function must be called within the context of a session but does not require a transaction.

(ii) Add Tuple—An application 114 can add a tuple to a telephony switch 20 by calling the add tuple function. The application 114 must provide the current session ID, the view ID, and the tuple contents. The view ID, tuple structure and tuple mask are dependent on the make, model and version of telephony switch being accessed, the structure being stored in database 120 for use by application 114. Optionally, information on tuples can be obtained by calling the Get Tuple Definition function described below. The success or failure of the operation is returned. If failure is returned, the tuple is not added. If a transaction, containing the view to be modified, is not open, failure is returned.

(iii) Delete Tuple—An application 114 can delete a tuple from a switch database 124 by calling the delete tuple function. The application 114 must provide the current session ID, the view ID, and the tuple. The view ID, tuple structure and tuple mask are dependent on the make, model and version of telephony switch 20 being accessed, the structure being stored in database 120 for use be application 114. Optionally, information on tuples can be obtained by calling the Get Tuple Definition function described below. The success or failure of the operation is returned. If failure is returned, the tuple is not deleted. If a transaction, containing the view to be modified, is not open, failure is returned.

(iv) Modify Tuple—The application 114 must provide the current session ID, the view ID, the old tuple and the new tuple contents. The view ID, tuple structure and tuple mask are dependent on the make, model and version of telephony switch being accessed 20, the structure being stored in database 120 for use by application 114. Optionally, information on tuples can be obtained by calling the Get Tuple Definition function described below. The success or failure of the operation is returned. If failure is returned, the tuple is not modified. If a transaction, containing the view to be modified, is not open, failure is returned.

(f) Get First/Next Functions—Two Get functions are provided:

(i) Get First Tuple (ii) Get Next Tuple.

(i) Get First Tuple—The application 114 can find the first tuple for a particular view on a switch database 124 by calling the get first tuple function. The application 114 must specify the current session ID, the view ID, and a tuple data structure. The view ID, tuple structure and tuple mask are dependent on the make, model and version of telephony switch being accessed, the structure being stored in database 120 for use by application 114. Optionally, information on tuples can be obtained by calling the Get Tuple Definition function described below. The success of the operation is returned and the tuple is provided in the tuple parameter. This function must be called within the context of a session but does not require a transaction to be accepted.

(ii) Get Next Tuple—This function is similar to the Get First Tuple function except that the application 114 must provide a start Tuple from which to start. The function will return the next tuple following the start Tuple for the specified view. The success of the operation is returned and the tuple contents of the matching tuple is provided in the tuple parameter. This function must be called within the context of a session but does not require a transaction to be accepted.

(g) Tuple Management Functions—A number of Tuple Management functions are provided. The application 114 can get the definition of a tuple for a particular view, based on the version of the software loaded in the telephony switch 20, by calling the get tuple definition function. The application 114 must specify the view ID and the switch load version which is either stored in the database 120 or obtained through the application 114. The success of the operation is returned and the tuple definition is provided in the tuple size parameter. The switch load version must be provided for backward compatibility. This does not necessarily represent the load version of any telephony switch 20 that the application 114 wishes to communicate with. The tuple definition includes information pertaining to but is not limited to the following items:

Tuple size

Key identification

Offsets of individual fields within the tuple

Sizes of individual fields

Field Data types

Field Data Ranges

This function can be called outside the context of a session since communication with a telephony switch 20 is not necessary.

(a) Malloctuple (b) Inituple (c) Freetuple (d) Getupletype (e) Getuplename (f) Getuplesize (g) Getuplenumfields (h) Getfieldnameptr (i) Getfieldkind (j) Getfieldtype (k) Getfieldsize (l) Getfieldxlationtbl (m) Setfield (n) Getfield (o) Copytuple All of the above functions are particular to the management station 10 and are designed to allow the application 114 to obtain information about the structure of the database table on telephony switch 20. In the discussion that follows, the operation of the functions is illustrated with respect to a Mitel® SX-2000® telephony switch, although it is within the scope of this invention that the functions would be modified to the particularities of different makes, models and versions of telephony switches. All of the above functions operate within the Application Access Layer and Database Access Layer of the management station 10. The functions allow the application to obtain information about the particular database and table structures utilized on the telephony switch 20. These functions need only be called if the application requires such information. It is possible for application 114 to be written to utilize the other aspects of the present invention without resorting to these functions, if the application is already aware of the database table structure and definition of the selected telephony switch. However, by adding this functionality to the present invention, compatibility between different versions of applications 114, DB access server 116 and telephony switch 20 can be enhanced as the application can query for the database structure on the telephony switch that it desires to communicate with. The intelligence regarding the structure of various database tables, views, et cetera for different makes, models, versions and revisions of telephony switch 20 is all contained within the DB access server 116 which allows the decoupling of the database application 114 from specific versions of telephony switch 20.

Each of the above functions are described in further detail below.

a) Malloctuple—This function takes the database view ideas of parameter and allocates a tuple buffer (area of memory) efficient to hold any tuple managed and manipulated by the application 114 and DB access server 116.

b) Inituple—This function takes the database view ID and a pointer to the tuple as a parameter and initializes the tuple buffer to remove its current contents.

c) Freetuple—This function takes the buffer allocated by the Malluctuple function and returns it when it is no longer used for recovery of system resources.

d) Gettupletype—This function takes the view ID and returns the type of the tuple. That is, the operations that are supported on that particular database view. The different view types may or may not support adding, deleting, modifying, or reading the data.

e) Gettuplename—This function takes the desired view ID and returns the name of the tuple.

f) Gettuplesize—This function takes the view ID and returns the size of the tuple.

g) Gettuplnumfields—This function gets the release addition and view ID and returns the number of fields in the tuple.

h) Getfieldnameptr—This function takes the view ID and field ID and returns the name of a given field in the tuple.

(i) Getfieldkind—This function takes the field ID and view ID and returns the kind of a given field in the tuple (i.e. integer, enumeration or string).

(j) Getfieldtype—This function takes view ID and field ID and returns the kind of a given field in the tuple (i.e. integer, enumeration or string).

(k) Getfieldsize—This function takes view ID and field ID and returns the size of a given field in the tuple (l) Getfleldxlationtbl—This function takes view ID and field ID and returns as a table used to translate an enumeration to its corresponding string in a given field in the tuple.

(m) Setfield—This function takes the release addition, view ID, field ID, field value and tuple and sets the value of a given field in the tuple.

(n) Getfield—This function takes the release addition, view ID, field ID, field value pointer and a tuple and gets the value of a given field in the tuple.

(o) Copytuple—This function takes the view ID, destination tuple and source tuple and copies the contents of the source tuple to the destination tuple buffer.

For further information on examples of the structure of data types which could be used for the above, please refer to the section Common data format below.

2) DATABASE ACCESS LAYER IN THE MANAGEMENT STATION

Returning to FIG. 4, the features of the database access layer in the telephony management station 10 incorporating the present invention is described. As mentioned above, application 114 on management station 10 communicates to DB access server 116 through API redirection layer 150. In an alternate embodiment, other DBA clients or other routing applications may utilize API redirection layer 150 to communicate with DB access server 116. DB access server 116 communicates through DB Comm server 152 which in turn communicates with Comms redirection layer 154. Comms redirection layer 154 then communicates with the data transport layer via communications pipe 122. Communication pipe 122 calls presentation layer service 156 to place the data in a format such as can be communicated to Ethernet card 110 and placed on local area network 30. The architecture of the present invention enables support of multiple independent applications.

The individual software components required to support DB access requests on the management station 10 are as follows:

(a) API Redirection Layer (b) API Parameter Data Format (c) Common Data Format (d) DB Access Server (e) DB Comms Server A brief overview of each software component is described in the following subsections.

(a) API Redirection Layer—The API Redirection Layer 154 resides in the management workstation 10 as a library of functions with which applications such as application 114 compile and link. The API Redirection Layer 154 translates the application 114 functions described above to a form to be processed by DB access server 116. These functions permit the application 114 to establish a socket connection with the DB access server 116 and issue Database Access requests to act on telephony switch 20. The API Redirection Layer isolates applications such as application 114 from the actual implementation of the DB access server 116. This isolation allows the DB access server 116 to be changed without impact to individual applications (i.e. old applications do not require recompiling or relinking to do the work with a new DB access server). API function calls by the application 114 as described in the section "Interface Between The Application and Database Access Layer in the Management Station" above are converted to associated messaging by using a simple socket connection and a common data format. Messages are sent and received synchronously (blocking for a response).

As described above, the application 114 makes an API function request to the API redirection layer 150. The API redirection layer 150 receives the API request from the application 114, converts the API request to a common data format request, then sends the common data format request DB access server 116. The DB access server 116 then processes the request and once processed, sends back a response in common data format to the API redirection layer 150. The common data format response is then formatted by the API redirection layer 150 into a format receivable by the calling API function and returned to the application 114.

Each application 114 communicates with an independent API Redirection Layer 150 process to manage access to DB access server 116.

The API redirection layer sends a common data format request message to the DB access server 116 and blocks for a response. The following API calls are managed by this layer:

View Set Management
    OrderViewSet
Error Identification
    GetErrorText
Application Registration
    Register
    Deregister
Session Management
    StartSession
    EndSession
Transaction Management
    StartTransaction
    SubmitTransaction
    CancelTransaction
Read/Write Functions
    GetTuple
    AddTuple
    DeleteTuple
    ModifyTuple
Get First/Next Functions
    FindTuple
    GetNextTuple For more information of these function calls, reference should be made to the "Interface Between The Application and Database Access Layer in the Management Station" section described above.

(b) API Parameter Data Format—The API Parameter Data Format is the format of the data and variables passed by the functions described above with respect to FIG. 4 and used by the application 114 and the API Redirection Layer 150. The API redirection layer 150 translates data received from the application 114 in API parameter data format to common data format and passes the information on to DB access server 116. These formats may be unique to the application but contain the information necessary to convert the information to common data format. The common data format is described in further detail below. The example below is particular to a Mitel® SX-2000® switch. Obvious modifications can be made to support other switch designs.

(c) Common Data Format—The common data format is used only by the API Redirection Layer 150, the DB access server 116, the DBA Comms Server 152 and the Comms Redirection Layer 154. Data structures are used by each component to compose or interpret the messages passed between them as untyped data. The API redirection layer 150 takes the data received from the application 114 in API parameter data format and converts it into common data format. The specific translation depends upon the make, model and version of the telephony switch being manipulated. The structure for a typical Mitel® SX-2000 switch will be used as an example. The common data format includes a version identification to ensure that backward compatibility can be supported in the future in the event that enhancements are made to the common data format itself. This format is hidden from the application 114. Changes to the common data format can be introduced independently such that the versions of each component can differ without loss of communication.

The DB access server 116 maintains a Client Record for each client (associated with the socket connection). This Client Record maintains the client type, status, name, release, session count, and socket connection record. API Redirection Layer 154 and DB Comms Server 152 clients are distinguished by a client type of CLIENT_APPLIC and CLIENT_NE, respectively.

Common Data Format Data Types

The common data format Data Types are passed between the API Redirection Layer 154, the DB access server 116 and the DB Comms Server 152.

The following is an example of the definition of the type of requests which are supported by the DB access server 116 and switch database server 118 of the present invention. These correspond to the action codes supported by the telephony switch 20.

```
typedef enum {
    DBA_REQ_NIL                 = DBA_FIRST_ENUM
    DBA_REQ_CLIENT_REGISTER,
    DBA_REQ_CLIENT_DEREGISTER
    DBA_REQ_ASYNC_ERROR
    DBA_REQ_SESSION_START
    DBA_REQ_SESSION_END
    DBA_REQ_TRANS_START
    DBA_REQ_TRANS_SUBMIT
    DBA_REQ_TRANS_CANCEL
    DBA_REQ_ADD_TUPLE
    DBA_REQ_MODIFY_TUPLE
    DBA_REQ_GET_TUPLE
    DBA_REQ_GET_FIRST
    DBA_REQ_GET_NEXT
    DBA_REQ_LAST
    DBA_REQ_END                 = DBA_LAST_ENUM
} dba2kRequest
```

The following is an example of the definition of the data structure for the data portion of a message to be sent to the telephony switch 20 for performing one of the transactions described above.

```
typedef struct {
    dba2kViewIdSet_t    dbakViewIdSet;
                            // This is the set of views (or tables)
                            to be locked when starting a
                            transaction.
    dba2kViewId_t       dbakViewId;
                            // This is the view (or table) being
                            acted upon (for adding, modifying,
                            deleting etc.)
    dba2kTuple_t        dba2kKeyTuple;
                            // This is the tuple key to use for a
                            transaction.
    dba2kTuple_t        dba2kFullTuple;
                            // This is the tuple to use for the
                            transaction.
} dba2kData_t;
```

The following is an example of definitions of the data structure for the client name and release edition or version of the switch, as well as a structure to hold the data portion of a message to be sent to the telephony switch 20.

```
typedef char    dbaClientName_t        [ DBA_NAME_STR_LEN + 1
];
typedef char    dbaRealeaseEdition_t   [DBA_RELEASE_STR_LEN +
1 ]
typedef dba2Kdata_t      *db_2kDataPtr_t;
```

/* This structure can grow in size to handle backwards compatibility */

```
typedef struct {
    int                  dbaHeaderSize;
    int                  dba2kDataSize;
    dbaRequest_t         dbaRequest;
    dbaError_t           dbaError;
                         // This is for the handling of errors
                         on the transaction.
    dbaClientName_t      dbaClientName;
                         // This is the name of the client for
                         the client register request.
    dba2kEdition_t       dbaReleaseEdition;
                         // This is the switch release edition
                         being contacted.
    dbaClientName_t      dbaAssociateName;
    dbaPlace_t           dbaAssociatePlane;
                         // The above two are associated
                         name the switch and controller for
                         a transaction (when the optional
                         redundant switch is contacted).
    int                  dbaSessionId;
                         // This is the unique identifier for
                         the transaction.
    dba2kDataPtr_t       dba2kDataPtr;
                         // This is the data accompanying
                         the transaction for performing of
                         the operation.
} dbaCdfMessage_t
```

The following is an example of definitions of the data structure for supporting a telephony switch 20 that has multiple planes (fault tolerant redundancy).

```
typedef enum {
    DBA_PLANE_NIL          = DBA_FIRST_ENUM,
    DBA_PLANE_A,
    DBA_PLANE_B,
    DBA_PLANE_ACTIVE,
    DBA_PLANE_INACTIVE,
    DBA_PLANE_END          = DBA_LAST_ENUM
} dbaPlane_t;
typedef int dbaError_t;
```

The following is an example of the definition of the kind of fields that may appear in a tuple.

```
    DBA2K_FIELDKIND_NIL           = DBA_FIRST_ENUM
    DBA2K_FIELDKIND_KBY
    DBA2K_FIELDKIND_READ_WRITE
    DBA2K_FIELDKIND_READ_ONLY
    DBA2K_FIELDKIND_SECONDARY_KEY
    DBA2K_FIELDKIND_END           = DBA_LAST_ENUM
} dba2kFieldKind_t;
```

The following is an example of the definition of the type of fields that may appear in a tuple.

```
typedef enum {
    DBA2K_FIELDTYPE_NIL       = DBA_FIRST_ENUM
    DBA2K_FIELDTYPE_INTEGER
    DBA2K_FIELDTYPE_ENUM
    DBA2K_FIELDTYPE_STRING
    DBA2K_FIELDTYPE_END       = DBA_LAST_ENUM
} dba2kFieldType_t;
```

The following is an example of the definition of the type of views that may appear in a telephony switch.

```
typedef enum {
    DBA2K_VIEWTYPE_NILE                   = DBA_FIRST_ENUM
    DBA2K_VIEWTYPE_FULL_FUNCTION_SUPPORT_
    WITH_BLANK_TUPLES,
    DBA2K_VIEWTYPE_FULL_FUNCTION_SUPPORT_
    NO_BLANK_TUPLES
    DBA2K_VIEWTYPE_NO_SUPPORT_FOR_ADD_
    OR_DELETE,
    DBA2K_VIEWTYPE_VIEW_HAS_COMPRESSED_
    MEMBER_LIST,
    DBA2K_VIEWTYPE_HEAD_ONLY,
    DBA2K_VIEWTYPE_END                    = DBA_LAST_ENUM
} dba2kViewType_t
```

The following is an example of the definition of what a field might look like that may appear in a tuple.

```
typedef struct {
    char                 *fieldName;
    int                  offset;
    int                  size;
    dba2kFieldKind_t     kind;
    dba2kFieldType_t     type;
    int                  minValue;
    int                  maxValue;
    strToEnum            {*xlationTbl} [];
    strToEnum            {apiXlationTbl} [];
} dba2kFieldDesc_t;
```

The following is an example of the definitions for the kind of fields that may appear in a tuples for different versions of telephony switch 20.

```
typedef dba2kFieldDesc_t {*dba2kFieldTblPtr_t} [];
typedef struct {
    dba2kFieldTblPtr_t    tupleFieldTblPtr;
    const dba2kEdition_c  releaseEdition;
    const int             numFields;
}dba2kTupleVersion_t;
typedef dba2kTupleVersion_t {*dba2kTupleVersionTblPtr_t} [];
typedef struct {
    dba2kTupleVersionTblPtr_t   tupleVerTblPtr;
    int                         tupleSize;
    char                        *tupleName;
    dba2kViewType_t             viewType;
}dba2kTupleDesc_t;
```

The following is an example of definitions of the data structure for the various types of views or tables which can be supported on telephony switch 20.

```
typedef enum {/* from view_identifier/dbviewid.typ */
    VID_NIL,
    VID_COR,
    VID_COS,
    VID_FAC,
          :
    VID_REMOTE_DN,
    VID_END                = DBA_LAST_ENUM
} ViewId;
```

Switch Database Data Types—Also when implemented with Mitel® SX-2000® switches, Switch Database Data Types are passed to the API redirection layer which directly reflects the Switch Database 124. These are:

```
typedef enum {
    CLIENT_NIL           = DBA_FIRST_ENUM,
    CLIENT_APPLIC,
    CLIENT_NE,
    CLIENT_END           = DBA_LAST_ENUM
} clientType_t;
typedef struct {
    dbaError_t           dbaError;
    boolean              dbaErrStrPresent;
    char                 dbaErrStr[
    DBA_STR_LEN_300];
} dbaLongError_t;
```

Session Id Data Types—The Session Id Data Types are also passed in all messages and cannot be changed, they are:

```
typedef struct {
    int dbaSysId;
    long int             dbaTaskId;
    char                 dbaPlaneId;
} dbaSessionId_t;
```

These common data format types are used internally to the Database Access Layer for management internally, and will change from implementation to implementation. For example, these may include:

define ABS_MAX_CLIENTS 8/* Must be greater than the number of all Clients Allowed */
define ABS_MAX_SESSION_COUNT4

```
typedef enum {
        STATUS_NIL,
        STATUS_OK,
        STATUS_NEW,
        STATUS_AWAITING_NE,
        STATUS_END
} clientStatus_t;
typedef struct {
char           clientSessionAssociateName[DBA_NAME_
               LEN];
int            clientSessionAssociateId;
int            clientSessionSqNbr;
} clientSession_t;
typedef struct {
        int                  clientNbr;
        clientType_t         clientType;
        clientStatus_t       clientStatus;
        char                 clientClientName[DBA_
                             NAME_LEN];
        char
```

-continued

```
        clientRelease[DBA_RELEASE_INFO_LEN];
        int                  clientSessionCount;
        clientSession_t
        clientSessionRec[ABS_MAX_SESSION_COUNT];
        ssuconnectRec_t      clientConnectRec;
} clientRec_t;
```

(d) DB Access Server—The DB access server 116 is provided as a separate daemon process running on the management station 10 which provides services to client applications 114. The present invention provides multiplexing support between multiple applications and multiple telephony switches. Simple socket connections are used to communicate with applications through the API Redirection Layer 154 and the DB Comms server 152, referred to collectively as clients. Backward compatibility support is provided using a common data format for the messages passed across the socket connection as is described in further detail below. Messages are sent and received asynchronously (non-blocking).

Socket operations and common data format messages are handled by the DB access server 116 exclusively through the DBA_Service socket. Where required, conversion is performed between common data format message versions and also between various Switch Database 124 versions.

To facilitate communication from management station 10 to telephony switch 20, the version of the DB access server 116 must be greater than or equal to the version of telephony switch 20. The DB access server 116 contains within it knowledge of the various models, versions and revisions of telephony switch 20 to enable it to translate commands and data received from application 114 to a format which can be understood by telephony switch 20. This allows for backward compatibility. DB access server 116 has knowledge of the various commands and data formats necessary to control and manage telephony switch 20. It is able to translate, supply and omit elements as necessary to package commands and present responses in a format which can be understood by both telephony switch 20 and application 114. One of the benefits of this design is that the application is not required to be aware of changes brought about by different models, versions and revisions of telephony switch 20. Through the registration function described above, the application 114 stipulates to the DB access server 116 the version, model and revision of telephony switch that it is capable of understanding, and the DB access server 116 can perform the translation necessary to present the application 114 with responses that the application can expect.

Performance Characteristics

The communication link and associated layers of the present invention impact PBX performance. This impact is dependent on the communication link characteristics The transaction mechanism allows an application to open multiple DB Views simultaneously. The more DB Views that are modified, the longer a submit action takes to complete. If an Activity Switch occurs at any time during the transaction, prior to the successful completion of a submit, all changes are rolled back. For this reason, it is recommended to limit the extent of changes performed within a single transaction. The Database access server 116 manages client connection requests and prepares an associated Client Record. Subsequent messages on the socket connection are handled in the context of the associated Client Record in common data format.

Each message is serviced independently and either forwarded or acted upon as required. Conversions between common data format messaging levels and between Switch Release levels are also performed as required.

Initialization—The Database access server 116 is launched at system start-up, when Database Access Functionality is enabled. Each Client Record is initialized to nil values and the DBA_Service socket service is established.

Each function provided by the API Redirection Layer 154 initiates a function request and blocks for the result of the request. A dbaError is returned which is either DBA_SUCCESS or a failure code.

Where required, the request is converted to a common data format request, passed to the DB access server 116, and the associated common data format response is converted for return to the application 114.

The following requests are communicated to and dealt with by the DB access server 116.

Client Connect—The handle Client Connect is invoked when a connection is established by the client on the DBA_Service socket. A Client Record is obtained and the connection record is initialized. The socket connection is denied if a Client Record is not available because the maximum number of simultaneous socket connections is exceeded.

Client Disconnect—The handle Client Disconnect is invoked when a disconnect of the client is recognized on the DBA_Service socket. The connection is closed and the associated Client Record is cleaned up, as required.

Client Register—Handle Client Register is marked by the client and determines the type of client connecting to the DB access server 116. The Database access server 116 initializes the associated Client Record accordingly.

Registration is denied if the number of allowed clients of the given type are exceeded.

Client Deregister—Upon receiving a Client Deregister request from the DB Comms Server 152, a check by the DB access server 116 is made of the number of sessions in progress. If no sessions are active the associated socket connection is closed, no notification is provided to associated clients.

Session Start—Upon receiving a Session Start request from the API Redirection Layer 150, the Client Records are scanned for an existing DB Comms Server 152 communicating with the desired telephony switch 20. If one does not already exist a DB Comms Server 152 is spawned by the Database access server 116. The dbaSessionId is initialized and partially established using the associated Client Record identifiers and the associated DB Comms Server 152 is forwarded the Start Session request. Upon receiving a Session Start request from the DB Comms Server 152, the associated Client is determined from the dbaSessionId. An acknowledgment is then sent to the requesting API Redirection Layer 154 process. At this point the dbaSessionId has been fully established.

Session End—Upon receiving a Session End request from the API Redirection Layer 150, a check is made of the number of sessions in progress. If no sessions are active the associated socket connection is closed.

The Session End request is not used by the DB Comms Server 152.

Request and Response—Handle Request and Response manages requests for Switch Database operations and the associated responses (transaction start, transaction submit, transaction cancel, get tuple, get first, get next, find first, find next, etc.). Validation of the dbaSessionId is performed and the common data format message is forwarded to the associated client. Compatibility conversion is also applied as required.

Constraints—Limitations on the number of simultaneous clients are imposed to manage resource constraints. The maximum number of all socket connections is specified along with limits on the number of clients of each client type.

Error Handling—Should any messaging failure occur on a socket connection, the associated client is deregistered and the socket connection is disconnected. No impact is incurred on any other established connection. Messages received which are destined for clients which no longer exist are disregarded. An unexpected message error will be logged in the event the client type is not allowed.

Additional Support Provisions

The following support provisions are provided within the DB access server 116:

(i) Switch DB Programming Verification
(ii) Support Multiple Management Station Sessions
(iii) Support Multiple Telephony Switch Sessions
(iv) Inactivity Timeout on Transactions
(v) Active and Inactive Plane Handling
(vi) Activity Switch Handling
(vii) Database Versions
(viii) Failure Recovery
(ix) Backward Compatibility These are described in further detail below.

(i) Switch DB Programming Verification—During any operations which change DB View contents on the telephony switch 20, a validation procedure is performed and any error is reported. If an error occurs, the validation failure is then communicated to the application 114 through the error identification function described above to take appropriate actions.

(ii) Support Multiple Management Station Sessions—The architecture of the present invention is engineered to support multiple sessions. That is, multiple management stations 10, or multiple user work stations, may access a given telephony switch 20 under the architecture of the present invention. From this aspect, the telephony switch may be more tightly integrated into a networked environment, as the status of various features of the telephony switch can be reported to multiple users, and can be changed by individual users on demand.

(iii) Support Multiple Telephony Switch Sessions—The architecture of the present invention provides support for multiple sessions to a single telephony switch 20 from different applications 114. This allows multiple applications to query and adjust different features of the telephony switch simultaneously.

(iv) Inactivity Timeout on Transactions—A programmable inactivity timeout, with default value of 20 minutes, is provided. This allows for hung or inactive sessions to be gracefully terminated.

(v) Active and Inactive Plane Handling—The architecture is engineered to support both the Active and Inactive planes of a redundant telephony switch 20. In the case the telephony switch is not partitioned, only DB Access sessions on the Active Plane are permitted to write changes to the telephony switch database 124.

(vi) Activity Switch Handling—Upon occurrence of an Activity Switch any established session is dropped without the specific reason provided to the application 114.

(vii) Database Versions—In the present example of a Mitel®® SX-2000® switch, it is obvious to one skilled in the art to make modifications to support the retrieval of the version of software from telephony switches of other models or manufacturers. In the preferred embodiment, the existing main controller load version retrieval mechanism for MNMS is used for SX-2000® switches. For other switches or models the appropriate mechanism to determine the software load version could be used. A table in the database 120 identifies Database Form changes for the different versions.

(viii) Failure Recovery—In the event a failure occurs, any transaction in progress is aborted and the application 114 is informed of the nature of the failure. A problem situation does exist when the transaction submit was requested by the application 114. Under this condition the submit may or may not have been successful prior to the failure. Further action may be required to verify the success of the submit operation.

The following specific failures are handled: Inactivity Timeout, Activity Switch, Link Outage, DB Access Server trap, Message Lost, Backwards Compatibility, Version Mismatch.

Inactivity Timeout—When the session inactivity timeout expires, any transaction in progress is aborted and the application session is closed.

Activity Switch—Upon activity switch notification from active to inactive, any transaction in progress is aborted.

Link Outage—Upon communication failure the DB access server 116 aborts any transaction in progress and closes the established session.

DB Access Server trap—In the unlikely event the DB access server 116 encounters a run-time trap, it is recreated and aborts any transactions in progress.

Message Lost—The existing link layer supports multiple re-transmission and message integrity. This is supported in both directions.

(ix) Backwards Compatibility—In the operation of the invention, the database access version is always equivalent to or higher than the highest version of switch 20 software to which it is connected. Requests and replies associated with an older version of switch 20 software are handled within the DB access server 116.

To facilitate communication from management station 10 to telephony switch 20, the version of the DB access server 116 must be greater than or equal to the version of telephony switch 20. The DB access server 116 contains within it knowledge of the various models, versions and revisions of telephony switch 20 to enable it to translate commands and data received from application 114 to a format which can be understood by telephony switch 20. This allows for backward compatibility. As DB access server 116 has knowledge of the various commands and data formats necessary to control and manage telephony switch 20, it is able to translate, supply and omit elements as necessary to package commands and present responses in a format which can be understood by both telephony switch 20 and application 114. One of the benefits of this design is that the application is not required to be aware of changes brought about by different models, versions and revisions of telephony switch 20. Through the registration function described above, the application 114 stipulates to the DB access server 116 the version, model and revision of telephony switch that it is capable of understanding, and the DB access server can perform the translation necessary to present the application with responses that the application can expect.

The application 114 should be recompiled against the DB access server 116 version for compatibility. For example, the following changes are supported by the DB access server 116:

New Table or View Added A table or view is not provided by the Switch 20, until an application 114 is designed to request it.

Old View Removed The application 114 request is rejected, if a table or View is not supported by the switch 20.

New Field Added (to end) The is-present flag is included in the API Redirection Layer support for the new field. If the field is not provided by the switch 20, the is-present flag for that field returns false. The field is not passed to an older version switch, if supplied by the application.

New Enumeration Added (to end) The enumeration value is rejected by the switch, if supplied by the application and not supported.

Version Mismatch

In the event the switch 20 software version is not recognized the telephony switch is not available for DBA sessions. An error is also returned to the application 114 by the Start Session request.

(e) DB Comms Server—The DB Comms Server 152 isolates the DB access server 116 from the network communications mechanisms. This includes the Presentation Layer Service 156 and the communications pipe 122.

This isolation allows the Presentation Layer Service 156 and the communications pipe 122 to be changed without impact to the DB access server 116 or applications 114. The DB Comms Server 152 process establishes a socket connection with the DB access server 116 and also listens for messages from the Comms Redirection Layer 154. Each message is serviced independently and either forwarded or acted upon as required. Messages are sent and received asynchronously (non-blocking) from both the telephony switch 20 and the DB access server 116. The DB Comms Server 152 is provided as a separate process running on the management station 10 and acts as a client of the DB access server 116.

A DB Comms Server 152 is spawned for each telephony switch 20, by the DB access server 116, in response to Application 114 requests. Destruction of the DB Comms Server 152 processes are also managed by the DB access server 116.

The DB Comm server 152 then processes the request and returns a common data response to the DB access server 116. The DB access server 116 then performs the necessary translation to handle backward compatibility and then transfers the common data results back to the API redirection layer 150.

Initialization—The DB Comms Server 152 is spawned by the Database access server 116 with command line parameters, including the identity of telephony switch 20 with whom to connect. A communication channel is setup with the telephony switch 20 and the Release Info regarding that switch is obtained. A message handler is then attached to listen on the communications pipe 122 connection. Upon successful completion of these operations the DB Comms Server 152 registers with the DB access server 116.

Interfaces—The DB Comms server 152 receives a common data request from the DB access server 116. The DB Comms server 152 then establishes a ComsessionID. The DB Comm server 152 then sends the common data request to the Comms Redirection layer 154 and waits for a response. When a response is received, the Comms redirection layer 154 passes a common data response back to the DB Comm server 152. The DB Comm server 152 then determines the comsessionID from the response and then sends the common data request back to the DB access server 116.

Socket operations and common data format messages are handled by the DB Comms Server 152 through the DBA_Service socket. Comms Redirection Layer 154 functions are utilized to manage communication with the telephony switch 20.

MESSAGES HANDLED BY DB COMMS SERVER

There are two types of messages which are received by the DB Comms server: messages from the DB access server 116 and messages from the telephony switch 20. The DB comms server receives DB access server messages from the DB access server 116 in common data format and passes them to the Comms Redirection Layer 154 for sending to the associated telephony switch 20. The message is converted to a common data format message and sent to the DB access server 116 for subsequent redirection based on the Session Id.

Session Start—Upon receiving a Session Start request from the DB access server 116 the session count is incremented and the request is passed to the Comms Redirection Layer 154. Upon receiving a Session Start response from the Comms Redirection Layer 154, the associated Client is determined from the comSessionId. The message is forwarded to the DB access server 116.

Session End—A Session End request from the DB access server 116 is forwarded to the telephony switch 20 via the Comms Redirection Layer 154, and the session count is decremented. In the event no more sessions are established to the telephony switch 20, a timeout is set to wait for the configured hold time.

Timeout—Timer expiry indicates the hold time has elapsed. The DB Comms Server 152 ensures there are no new sessions established, disconnects the telephony switch 20 and terminates. If a session has been established the timeout is cleared.

Error Handling—In the event a connection cannot be established or is dropped, the existing error handling is utilized. Severe errors are logged, using the existing log mechanism, as appropriate. The socket connection to the DB access server 116 is also closed.

3. INTERFACE BETWEEN DATABASE ACCESS LAYER AND DATA TRANSPORT LAYER IN THE MANAGEMENT STATION

The interface between the Database Access Layer and the Data Transport Layer is performed by the following features:

(a) Comms Redirection Layer 154
(b) The communications pipe 122; and
(c) The Presentation Layer service 156.

These are described in further detail below.

(a) Comms Redirection Layer—The Comms Redirection Layer 154 isolates the DBA Comms Server 152 from the actual implementation of the specific network transport mechanism. The Comms Redirection Layer 154 resides in the management station 10 environment as a library of functions with which programs compile and link. The Comms Redirection Layer 154 provides functions to utilize communications pipe services. These functions manage the opening and closing of connection to telephony switch 20, and the exchange of messages. A function is also provided to query the software release of the telephony switch 20. The Comms redirection layer receives a common data request from the DB Comms server 152. The Comms redirection layer 154 converts the common data request to the form used by the data transport mechanism and sends the request to communications pipe 122. The communications pipe 122 then communicates the request to the telephony switch 20. When a response is received from telephony switch 20, in the form of a transport mechanism response, the communications pipe 122 passes the response to the Comms redirection layer 154. The Comms redirection layer 154 converts the response to a common data request and sends the common data request to the DB Comm server 152.

The Comms redirection layer translates messages from common data format received from the DB Comms server 152 to the desired message format used by the data transport layer to communicate with the telephony switch 20. The invention can be practiced using any data transport mechanism or message format, but for the purposes of illustration, the MNMS data format provided by Mitel® and the Z.300 data format will be used. Z.300 is an international publicly known standard described in CCITT document Volume X Facicle X. Rec Z301–Z341. If the invention is practiced utilizing another data transport mechanism, the Comms Redirection Layer 154 must be reprogrammed to accept messages in this other data format to translate them to the common data format used by the DB Comms server 152. The telephony switch 20, when it receives the data, unpackages the data from its message transport format for eventually processing. The telephony switch 20 and management switch 10 must therefore use a compatible message transport mechanism.

MNMS Message Data Format—The MNMS Message Data Format is an example of a message transport mechanism protocol which can be used by the Comms Redirection Layer 154 and the communications pipe 122 to communicate with telephony switch 20 via the Presentation Layer Service 156. Messages are translated from this format to common data format to be handled by the DB Comms Server 152.

This data is passed as a typed data structure to the transport protocol for transport. The MNMS Data types are not an aspect of this invention, but, for more information they are described in further detail.

Where required, the request is converted from a common data format request to a transport protocol message and passed to the communications pipe 122. Translation is also applied in the reverse direction. The following messages, along with the data supplied to the Comms redirection layer is sent to the communications pipe 122 for communications with the telephony switch 20.

(i) Send Common Data Format Request—Sends common data format Request converts a common data format message to transport protocol message and passes it to the communications pipe. A sequence number is used in the message based on a unique identifier.

(ii) Receive Common Data Format Response—Receive common data format Response obtains an MNMS message from the communications pipe 122 and converts it to a common data format message. The sequence number in the message is used to determine the unique identifier.

(iii) Connect To Telephony Switch—Connect to telephony switch establishes a communication channel with the specified telephony switch 20. The switch name is validated, utilizing the database, and an attempt to open a connection is made. Should the initial attempt fail, it will retry after a delay based on the reason for failure. On successful connection the applicId is used to register for reception of messages.

(iv) Disconnect From Telephony Switch—Disconnect from network element closes an existing MNMS communication channel with the specified Network Element.

(v) Get Switch Release Info—Get switch release info obtains the software release info from the telephony switch.

b) Presentation Layer Service—The Presentation Layer Service 156 is an existing library of functions which manage translation and transformation between message or data transport format and specific Z.300 data representations. The Presentation Layer Service 156 resides in the management station 10 environment as a library of functions with which the DB Comns Server 152 is compiled and linked.

c) Communications Pipe—The communications pipe 122 resides in the data transport layer and is an existing daemon process which manages connections with individual telephony switches. It exists as a library of functions with which the DB Comms Server 152 is compiled and linked. The communications pipe manages communication with the connected telephony switch 20. Functions are provided to connect and disconnect the communication channel and facilitate message passing. The Z.300 Data Format is used by the communications pipe 122 and the existing Transport Layer to communicate with telephony switch 20 via the Presentation Layer Service 156. The invention is not dependent on this data format. Other data formats can be used.

ARCHITECTURE WITHIN THE TELEPHONY SWITCH

Figure 5:
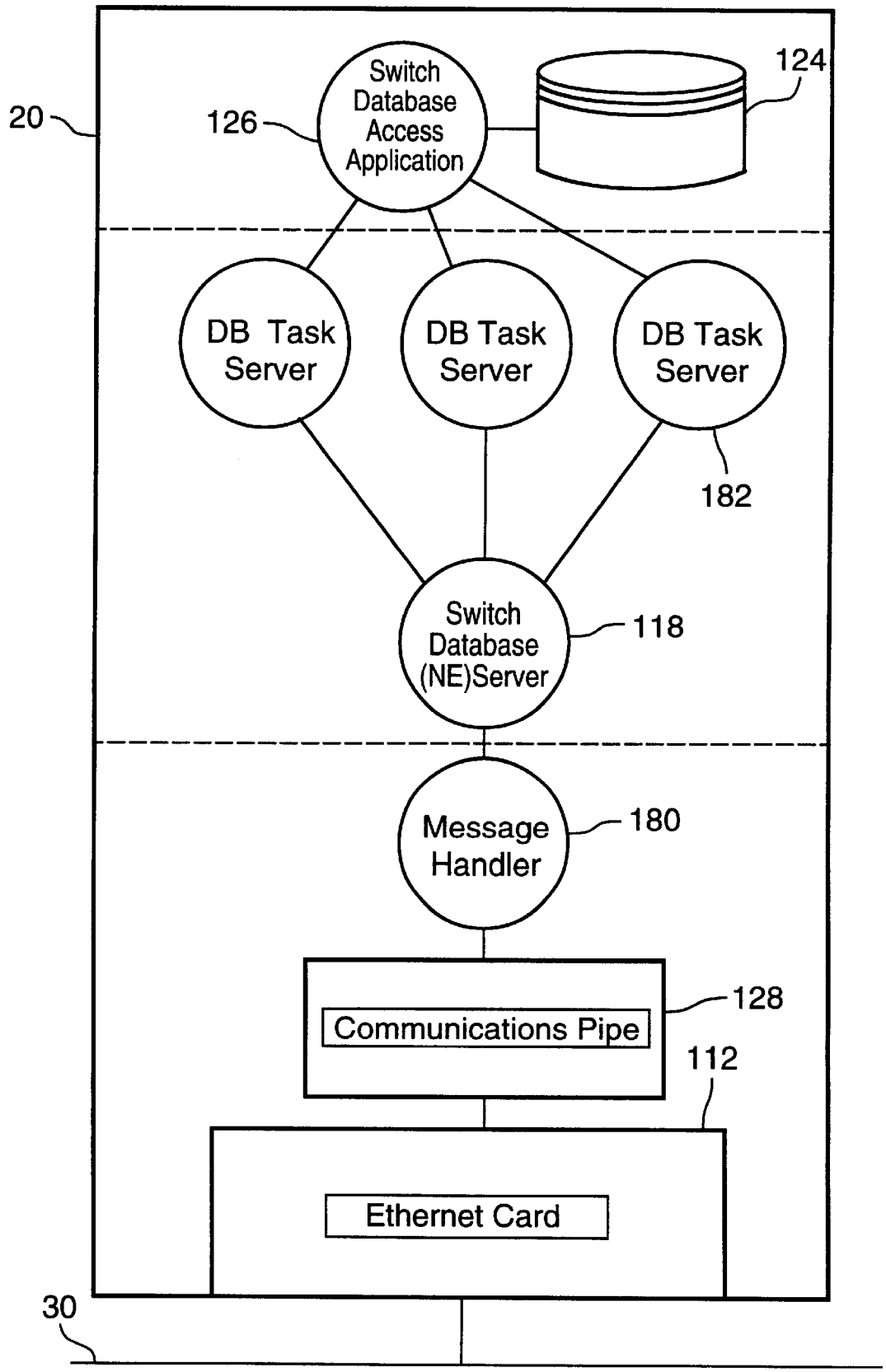
FIG. 5 is a detailed block diagram of a network element according to the preferred embodiment installed in a telephony switch.

Turning to FIG. 5, the features of the architecture of the present invention in a telephony switch are described in further detail. To a large extent, the architecture within the telephony switch 20 to implement the present invention is the mirror image of that found on the management station 10 previously described. The translations performed are merely the unpackaging of the information packaged at the management station 10. As such, guidance for the operations performed on the telephony switch can be obtained in reference to the operations performed on the management station 10 described above.

In summary, the message sent from management station 10 is received by telephony switch 20 through Ethernet card 112. The message is then transferred through communications pipe 128 to message handler 180. Message handler 180 translates the message from its format into DBA request record format to interface with switch database server 118. The translation formed by communications pipe 128 and message handler 180 is described in further detail below. Message handler 180 translates the message from its data transport format into DBA request record format so that it can be handled by switch database server 118. The switch database server 118 then spawns a DB task server 182, (one for each session). The switch database server 118 then passes the DBA request record to the DB task server 182 for further processing. DB task server 182 then translates the DBA request record into the appropriate format acceptable to switch database access application 126 and passes the request to switch database access application 126 for processing. Switch database access application 126 then processes the request by accessing switch database 124 and returns the result back to DB task server 182. The response is then translated by DB task server 182 back into DBA request record format and the record is then passed to switch database server 118 for further processing. The response then travels through switch database server 118 through the database access layer to the data transport layer to message handler 180. Message handler 180 then performs the translation for communications pipe 128 and passes the transformed message to the communications pipe 128. Communications pipe 128 then passes the message to Ethernet card 112 which interfaces with local area network 30 to be sent back to the originating management station or device.

4. INTERFACE BETWEEN THE DATA TRANSPORT LAYER AND DATABASE ACCESS LAYER IN THE TELEPHONY SWITCH

The data arrives from network 30 and passes through Ethernet card 112 to communications pipe 128. Message handler 180 then allocates a DBA request record, converts the input data format to DBA request record format and then sends the DBA request record format to the switch database server 118. Switch database server 118, which receives the database request record allocates resources to service the data and sends the service data back through the interface to message handler 180. Message handler 180 then converts the DBA request records back to the appropriate format for the communications pipe 128 to receive and then forwards the formatted data back to the communications pipe 128 for transport. The message handler also de-allocates the space for the DBA request record if required. There are three aspects to the interface between the data transport layer and the database access layer on the telephony switch 20:

(a) Communications pipe
(b) Message handler
(c) DB access request record

The following aspects of the interface between the data transport layer and the database access layer within the telephony switch 20 will be described in further detail below (a) Communications Pipe—The communications pipe 128 is responsible for handling the input/output of data for a specific transport mechanism. The communications pipe 128 unpackages the data packaged through the communications pipe and mechanism in the management station 10. In the preferred embodiment, the OPSMAN MNMS pipe is described for illustration, although other data transport mechanisms may be used. The communications pipe 128 is responsible for converting the Z.300 transport layer data format to and from a MNMS data format and passes them to the message handler 180. The communications pipe 128 then translates the message into a DBA request record to be used by the switch database access server 118 and DB Task Servers 182. It also parses the text data into pascal tuple structures.

(b) Message Handler—Each message handler 180 is identified by a unique id. New handler ids are added as required. When a message handler is initialized usually at system start up, it must register with switch database server 118 before being allowed to send DB access messages. The registration process includes identifying a callback function with the switch database server 118 for the message handler 180. Switch database server 118 uses the callback function to return DB access results to the message handler 180.

The operation of the interface between the message handler 180 and the switch database server 118 is as follows: message handler 180 passes DBA request record to switch database server 118. The switch database server 118 spawns a DB task server 182 and enters cross references in its resource table to pass the messages to new DB task server 182 if a new session is required to set up. In the alternative, if a new session is not required, the switch database server 118 merely passes the message onto the existing DB task server 182. DB task server 182 receives the DB access request record that services the request. Once the request is serviced, DB task server 182 sends back the service data to the switch database server 118. Upon receipt, the switch database server 118 forwards the service data back through the interface to message handler 180 according to the resource table.

The message handler 180 is divided into an input process and an output process. The input process binds to the communications pipe and listens for a message from the management station 10. When a message is received through the communications pipe 128, the message handler 180 obtains a DBA Request Record from the DBA Request Record pool, parses the text data, fills in the DBA Request Record, and sends a dba_request message to the switch database Server 118.

The callback function for the message handler 180 is a routine that sends a reply message to the message handler 180. The output process listens for a reply message from the switch database server 118. The message data contains the index of a DBA Request Record resource. The message handler 180 converts the data into format for the communications pipe 128 and sends the message to the management station.

To convert messages into the DB Request Record format, the message Handler 180 obtains a DBA Request Record resource from the DBA Request Record pool. The tuple text portions of the message are parsed and copied to the DBA Request Record. A message is then sent to switch database server 118 with the resource index included in the message.

Optionally, the message handler 180 may log some information from the incoming message into a transport record. The transport record is obtained from a free list managed resource pool. The record contains information required by the handler's output process but can't be carried in the DBA Request Record. A field in the DBA Request Record is used to record the resource number of the transport record. The sequence number from the message handler message is recorded in the transport record and the transport record resource is stored in the DBA Request Record.

When a message is received from the communications pipe, the message handler 180 determines which message is being sent, and performs the following operations on the message data:

- obtain a DBA Request Record resource
- parse the tuple or key text data for insertion in the DBA request record
- parse the view set text data for insertion in the DBA request record
- parse the tuple mask data for insertion in the DBA request record
- fill in the DBA Request Record with the parsed data.
- obtain a transport record resource from the Transport Record pool.
- fill in the Transport Record and store the resource number in the DBA Request Record
- send a message to switch database server 118 with the resource index of the message data.

The submit and cancel transaction actions requires a parameter containing a session id. The transaction start action requires a parameter that contains a session id and view set information.

The message handler 180 receives database access reply messages from the switch database server 118 in response to database access request messages. These reply messages contain resource numbers for DBA Request Record resources. The same resource that was allocated when the request first came from management station 10 is used. The message handler 180 then converts the tuple data in the DBA request records to the communications pipe message format. It then sends the message to the communications pipe 128. The DBA Request Record resource is then returned to the pool.

When the switch database server 118 is ready to send a reply back to the message handler 180, it passes the index of a DBA Request Record to get to the message data.

(c) DBA Request Record Format—The occurrence of the DBA Request Record is to release the switch database server 118 from reliance upon a particular communications pipe's data representation. In this way a new communications pipe and a new method to support connections to different kinds of switches can be added without having to modify the switch database server 118. Any communications pipe 128 may be used that can transfer the data to the message handler 180. The message handler then requires modification in such a manner as would be obvious to one skilled in the art, to take of the data received and transform it to DB access request record format. The DBA Request Record contains all of the tuple, view, view set, and other information required to provide access to the switch database 124. While most of the information is sourced from the application 114 and database access layer on the management station 10, some information is filled in by the message handler 180. Database access results are also stored in this structure.

```
db_request_record_type =
    RECORD
        dba_session_id          : dba_session_id_type;
        dba_action_code         : dbserver_action_code_type;
        dba_view_id             : view_identifier;
        dba_old_tuple           : view_tuple;
        dba_view_tuple          : view_tuple;
        dba_view_set            : view_identifier_set;
        dba_tuple_mask          : tuple_string_type;
        dba_error_ref           : db_error_msg_reference;
        dba_transport_hdlr_id   : dba_transport_id_type;
        transport_hdlr_resource : resource_range; {OPTIONAL}
    ENDREC;
```

One record of this type is allocated for each dbaccess request and returned to the pool when the request has been completed.

- dba_session_id—the session id is allocated by the switch database server 118 process when a start session request is received.
- dba_action_code—This field is filled in by the message handler 180 to indicate the action requested by the application 114.
- dba_view_id—This field is filled in by the message handler 180 from data provided by the application. It is the view_id of the view the action is to be performed on.
- dba_old_tuple—This field is filled in by the message handler 180 with data provided by the application 114. This field is only required for the action of modifying a tuple.
- dba_view_tuple—This field is an input and output field. It is filled in by the message handler 180 with data provided by the application 114 for writing to the database and filled in by switch database server 118 with results of a requested action.
- dba_view_set—This field is filled in by the message handler 180 with data provided by the application 114.
- dba_tuple_mask—This field is filled in by the message handler 180 with data provided by the application 114. It is used only for the dba_find actions. It is the mask that describes the search criteria for tuple searches.
- dba_error_ref—This field is filled in by switch database server 118 to indicate any error conditions that result from a dbaccess request.
- dba_transport_hdlr_id—This field is filled in by the message handler 180 with the message handler 180 is unique id. This value will later be used to obtain the callback function for the message handler 180.

transport_hdlr_resource—This field is optional. It can be used by the message handler 180 to record a resource id for a resource that it requires over and above the data that is stored in the DBA Request Record. In this way, the message handler 180 can piggy-back data onto the DBA Request Record.

For further details on the information handled by the DBA Request Record, please refer to the section on common data format previously described above.

5. DATABASE ACCESS LAYER IN THE TELEPHONY SWITCH

The switch database server 118 is the focus for the movement of requests through the switch. It receives DB access requests from the various handlers in DBA Request Record format, allocates resources to service the request and passes back the serviced data to the message handlers.

The database access server spawns a new DB Task Server 182 process whenever a start session message is received from a message handler 180. For all other message types it examines the sessionID to identify an existing DB Task Server to pass the message to. The switch database Server 118 maintains a resource table that keeps track of what handlers are communicating with what DB Task Servers 182. The switch database Server 118 validates the sessionID and forwards messages to the DB Task Server 182 process identified in the sessionID.

The Switch database server 118 receives database access request messages, Inactivity Timer messages, and can send a Database access reply message.

The switch database server 118 consists of one permanent process which is usually created at system startup.

When a message handler 180 has received a DB Access request it sends the switch database server 118 a database access message after preparing the requested data in DB access record format. The message data will contain a resource number for a database access data structure allocated by the handler. The switch database server 118 examines the data structure to determine a course of action. It is concerned with two items, the sessionID and the DB action. If the sessionID is blank and the DB action is 'start session' then switch database server 118 allocates a DB Task process from a pool of processes and forwards the database access message to the new Task process. If the sessionID is not blank then the server verifies that the sessionID contains the system ID for the switch, and that the processID is the that of an existing DB Task 182 process. If all of the checks pass then the database access message is forwarded to the DB Task 182 process. Finally, it updates a cross reference table with the sessionID and HandlerID. When the switch database server 118 receives a database access message from a DB Task server 182, it forwards the message to the appropriate message handler 180 by checking the cross reference table.

6. INTERFACE BETWEEN DATABASE ACCESS LAYER AND APPLICATION LAYER IN TELEPHONY SWITCH

The DB Task server receives the basic commands originally issued from the application 114 and translates them into a format which can be passed to and executed by the switch database access application 126. The exact translation to be performed depends upon the features of the switch database access application and the exact make, model and version of telephony switch 20. The necessary translation for implementation can be performed by any person skilled in the art of programming the telephony switch 20.

The DB Task Server 182 is responsible for servicing the DB access requests. It is spawned when the switch database server 118 receives a start session message and is terminated when it receives an end session message.

Initialization—The task server process is created by the switch database server 118 on a per session basis and is a permanent process. It is responsible for allocating a sessionID at session start-up time and processing subsequent requests for that sessionID.

The DB Task server 182 allocates a sessionID when it receives a start session request in a database access request message. The sessionID contains the processID of the Task server 182, the systemID of the switch and the planeID. The sessionID is passed back to the switch database server 118 in a database access reply message.

The first task the DB Task Server 182 performs is to allocate a sessionID and pass it back to the DB NE server. All subsequent DB access requests are verified against that sessionID by the switch database server 118. The DB Task Server 182 performs additional checks on the process id portion of the sessionID.

The DB Task Server 182 receives a DBA Request Record that contains all of the data required to perform the requested action. It calls the appropriate functions, (e.g. for Mitel®® DBVIEW functions) to perform the action and places the resulting data back into the DBA Request Record. The resulting data and responses are passed back to the switch database Server 118 which forwards it on to the appropriate message handler 180.

One DB Task Server 182 process is allocated for each session.

The DB Task Server 182 supports the following functions:
(i) Error Identification
   Get Error Text
(ii) Service Session functions
   Start Session
   End Session
(iii) Service Translation Functions (Translation Management)
   Start Transaction
   Submit Transaction
   Cancel Transaction
(iv) Get First/Next Requests
   Get First Tuple
   Get Next Tuple
(v) Read/Write Requests
   Get Tuple
   Add Tupple
   Delete Tuple
   Modify Tuple These functions constitute the API and correspond to the function calls made by the application 114 on the management station 10. The database task server 182 then transforms the request to the specific form and passes it to the switch database access application 126.

(i) Error Identification—
(ii) Service Session Functions—The DB Task server 182 services the two session functions, start and end.
   Start Session—The Task Server 182 allocates a sessionID
   End Session—The Task Server 182 verifies that the sessionID is correct and checks that no transaction is active. If a transaction is active, an error message is returned to indicate that the transaction must be submitted or cancelled before the session can end. If no transaction is active then the DB Task server 182 simply sends a dba_reply message back indicating no error.

(iii) Service Transaction Functions (Transaction Management)—The DB Task server 182 services the three transaction functions, start, submit, and cancel.
  (a) Start Transaction—When the Task server receives a start transaction request, the DB Task server 182 examines the DBA Request Record for the textual view set parameter. The text is passed through a view set text parser. When implemented on a SX-2000® switch, the resulting view set is opened for write access by the DB Task server 182 by calling the DBVIEW open_view_set function. The views are opened and locked. The success or failure of the open operation is recorded in the DBA Request Record and the Task server 182 sends a database access reply message back to the switch database server 118 indicating the DBA Request Record resource.
  (b) Submit Transaction—When the Task server receives a submit transaction request, it translates and passes the request to the switch database access application 126. For example, with a Mitel®® SX-2000® switch, it calls the DBVIEW close_view_set function with the db_mode parameter set to db_commit. The changes in the underlying database tables for the open view set are flushed to the hard drive and the view set is closed and unlocked. The success or failure of the submit operation is recorded in the DBA Request Record and the DB Task server 182 sends a database access reply message back to the switch database server indicating the DBA Request Record resource.
  (c) Cancel Transaction—When the DB Task 182 server receives a cancel transaction request, it translates and passes the request to the switch database access application 126. For example, with the Mitel®® SX-2000® switch, it calls the DBVIEW close_view_set function with the db_mode parameter set to db_abort. The changes in the underlying database tables for the open view set are restored from the hard drive and the view set is closed and unlocked. The success or failure of the cancel operation is recorded in the DBA Request Record and the DB Task 182 server sends a database access reply message back to the switch database server 118 indicating the DBA Request Record resource.

(iv) Get First/Next Requests
The DB Task server 182 services the data view functions.
  (a) Get First Tuple—When the DB Task server 182 receives a get first tuple request, it examines the DBA Request Record for the view id. The view id is passed to the switch database access application 126. For example, with a Mitel®® SX-2000® switch the, DBVIEW first_view_key function. The first key for the specified view id is returned and the DB task server 182 passes the key to the DBVIEW read_view_tuple function. The tuple contents or any resulting error codes are stored in the DBA Request Record. The DB Task 182 server then sends a database access reply message back to the switch database server 118 indicating the DBA Request Record resource.
  (b) Get Next Tuple—When the DB Task server 182 receives a get next tuple request, it examines the DBA Request Record for the view id and the textual view tuple parameter. The text is passed through a view tuple text parser. The key data is extracted from the tuple data and the request is translated and passed to the switch database access application 126. For example, with a Mitel®® SX-2000® switch, the DBVIEW next_view_key is called with the key data. The next key for the specified view id is returned and the DB task server 182 passes the new key to the DBVIEW read_view_tuple function. The tuple contents or any resulting error codes are stored in the DBA Request Record. The DB Task server 182 then sends a database access reply message back to the switch database server 118 indicating the DBA Request Record resource.

(v) Read/Write Requests
  (a) Get Tuple—When the DB Task server 182 receives a get tuple request, it examines the DBA Request Record for the view id and the textual view tuple parameter. The text is passed through a view tuple text parser. The key data is extracted from the tuple data and the DB task server translates and passes the request to the switch database access application 126. For example, with a Mitel®® SX-2000® switch, the DBVIEW read_view_tuple is called with the key and tuple data. The tuple contents or any resulting error codes are stored in the DBA Request Record. The DB Task server 182 then sends a database access reply message back to the switch database server 118 indicating the DBA Request Record resource.
  (b) Add Tuple—When the DB Task server 182 receives an add tuple request, it examines the DBA Request Record for the view id and the textual view tuple parameter. The key data is extracted from the tuple data and the request is translated and passed to the switch database access application 126. For example, with a Mitel®® SX-2000® switch, the DBVIEW write_view_tuple is called with the key, tuple data and parameters. Any resulting error codes are stored in the DBA Request Record. The Task server 182 then sends a database access reply message back to the switch database server 118 indicating the DBA Request Record resource.
  (c) Delete Tuple—When the DB Task server 182 receives a delete tuple request, it examines the DBA Request Record for the view id and the textual view tuple parameter. The key data is extracted from the tuple data and the request is translated and passed to the switch database access application 126. For example, with a Mitel®® SX-2000® switch, the appropriate DBVIEW function is called. Any resulting error codes are stored in the DBA Request Record. The DB Task server 182 then sends a database access reply message back to the switch database server 118 indicating the DBA Request Record resource.
  (d) Modify Tuple—When the DB Task server 182 receives a modify tuple request, it examines the DBA Request Record for the view id and the textual view tuple parameters. In this case there will be old and new tuple parameters. It compares the keys and calls the appropriate DBVIEW write_view_tuple function, replace_views_tuple function or delete_view_tuple function as necessary. Any resulting error codes are stored in the DBA Request Record. The DB Task server 182 then sends a database access reply message back to the switch database server 118 server indicating the DBA Request Record resource.

Although the invention has been described in terms of the preferred and several alternate embodiments, those skilled in the art will appreciate other modifications and alternation that can be made without departing from spirit and scope of the teachings of the invention. All such modifications are intended to be included within the scope of the claims appended hereto.

We claim:

1. A telephony switch configurator to manage and control a plurality of different telephony switches from a network device, each of said telephony switches containing a read/writable storage medium for storing switch configuration data and which is accessible from a computer network through a second data transport protocol handler, the network device communicating with said network through a first data transport protocol handler, said configurator comprising:

(a) a command generator within said network device that issues commands to be executed by said telephony switches;

(b) a first access server within the said network device for managing a connection to said telephony switches;

(c) a first interface between said command generator and said first access server for translating said commands between said command generator to said first access server;

(d) a second interface between said first access server and said first data transport protocol handler for translating said commands between said first access server and said first data transport protocol handler;

(e) a second access server within each of said telephony switches for managing a connection to said network device;

(f) a third interface between said second access server and said second data transport protocol handler for translating said commands between said second data transport handler and said second access server;

(g) a command executor within each of said telephony switches that executes said commands for changing configuration of said telephony switches; and (h) a fourth interface between said second access server and said command executor for translating said commands between second access server and said command executor.

2. The configurator of claim 1, wherein said command generator comprises a database management system, a database access application and a user interface.

3. The configurator of claim 2, wherein said database access application is composed of database tables with identical database structure as said telephony switch.

4. The configurator of claim 3, wherein said first access server maintains connections to a plurality of telephony switches simultaneously.

5. The configurator of claim 3, wherein said telephony switch has a command set that is different from said configurator.

6. A method of managing and controlling a telephony switch from a network device, said telephony switch communicating with a computer network through a data transport protocol, and a network device communicating with said network through said data transport protocol, comprising the steps of:

a) initiating a command to connect to a selected telephony switch from said network device;

b) translating said command to a format understood by a first access server;

c) passing said command to said first access server;

d) opening a communications channel to said selected telephony switch;

e) packaging said command for transport using said data transport protocol;

f) passing said command to data transport protocol mechanism;

g) transporting said command on said network to said specified telephony switch using said data transport protocol;

h) unpackaging said command received by said telephony switch using said data transport protocol mechanism;

i) passing said command to a second access server;

j) translating said command to a form which can be executed by said telephony switch;

k) executing said command on said telephony switch for changing configuration of said telephony switch.

7. A method of configuring a network of telephony switches from a network device, said telephony switches communicating with a computer network through a data transport protocol and said network device communicating with said network through said data transport protocol, comprising:

a) initiating a command to connect a first selected one of said telephony switches from said network device;

b) downloading configuration information from said first selected one of said telephony switches to said network device;

c) translating the configuration information into configuration information understandable by a second selected one of said telephony switches;

d) initiating a command to connect to a second selected one of said telephony switches to said network device; and e) uploading said information from said network device to said second selected one of said telephony switches.

8. A recordable medium having a computer program therein, configuring a network of telephony switches from a network device, said telephony switches communicating with a computer network through a data transport protocol and said network device communicating with said network through said data transport protocol, comprising:

a) initiating a command to connect a first selected one of said telephony switches from said network device;

b) downloading configuration information from said first selected one of said telephony switches to said network device;

c) translating the configuration information into configuration information understandable by a second selected one of said telephony switches;

d) initiating a command to connect to a second selected one of said telephony switches to said network device; and e) uploading said information from said network device to said second selected one of said telephony switches.

9. A telephone switch configurator for administrators to manage a plurality of telephone switches, comprising:

a universal user interface providing administrators with generic access and commands to manage said telephone switches;

a translation system translating generic data including commands of the universal user interface to data understandable by the telephone switches and translating data from the telephone switches to generic data understandable by the universal user interface; and a communications system providing communications between the universal user interface, the translation system and the telephone switches.

10. The telephone switch configurator of claim 9, wherein the communications system comprises at least one port to connect to at least one of area network connection, dial up remote access connection, and direct access connection for communications between the universal user interface, the translation system, and the telephone switches.

11. The telephone switch configurator of claim 9, wherein the universal user interface and the translation system are integral within a management station; and the communications system comprises at least one of area network connection, dial up remote access connection, and direct access connection.

12. The telephone switch configurator of claim 9, wherein the translation system is integral with each of the telephone switches; and the communications system comprises at least one of area network connection, dial up remote access connection, and direct access connection between the universal user interface and the telephone switches.

13. The telephone switch configurator of claim 9, wherein the universal user interface further comprises:

a telephony switch database which includes settings and configuration tables of the telephone switches.

14. The telephone switch configurator of claim 13, wherein each of the telephone switches further comprises:

a configuration database which includes settings and configuration tables of said telephone switch.

15. The telephone switch configurator of claim 14, wherein said configuration database has a database structure which is not identical with the database structure of at least one other of said telephone switches.

16. The telephone switch configurator of claim 14, wherein the universal user interface aligns the configuration database of each of the telephone switches with a first set of data in the telephony switch database, and further aligns the telephony switch database with a second set of data in the configuration database of each of the telephone switches.

17. The telephone switch configurator of claim 9, further comprising:

an application programmer's interface for telephone users and their computer applications to access the universal user interface.

18. The telephone switch configurator of claim 17, wherein the universal user interface permits the telephone users and their computer application is to access and control telephony settings and features.

19. The telephone switch configurator of claim 9, wherein the universal user interface further comprises:

an intercommunications mechanism facilitating communications between the telephone switches and with other devices in a protocol independent manner.

20. The telephone switch configurator of claim 19, wherein the intercommunications mechanism further provides:

transferring data from one configuration database in a telephone switch to another configuration database in another telephone switch and whereby the translation system translates the data into a format understandably by said another telephone switch.

21. The telephone switch configurator of claim 9, wherein the commands include at least one of search, read, write, add, delete, first, next, previous and last operations.

22. The telephone switch configurator of claim 10, wherein said at least one port comprises an ethernet card.

23. A method of managing a plurality of different telephone switches from a universal user interface, which is in communication with said different telephone switches, comprising:

providing administrators with generic access and an ability to produce generic switch configuration data to manage said different telephone switches from the universal user interface; and translating said generic switch configuration data to switch configuration data for the different telephone switches and translating data from the different telephone switches.

* * * * *